United States Patent [19]

Kuno et al.

[11] Patent Number: 4,824,218

[45] Date of Patent: Apr. 25, 1989

[54] OPTICAL MODULATION APPARATUS USING FERROELECTRIC LIQUID CRYSTAL AND LOW-RESISTANCE PORTIONS OF COLUMN ELECTRODES

[75] Inventors: Mitsutoshi Kuno, Tokyo; Masahiko Enari, Yokohama; Hitoshi Shindo, Atsugi; Isamu Shimoda, Zama; Seishiro Yoshioka, Isehara; Shuzo Kaneko, Tokyo; Tsutomu Toyono, Yokohama, all of Japan

[73] Assignee: Canon Kabushiki Kaisha, Tokyo, Japan

[21] Appl. No.: 33,578

[22] Filed: Apr. 2, 1987

[30] Foreign Application Priority Data

| Apr. 9, 1986 | [JP] | Japan | 61-82924 |
| Apr. 9, 1986 | [JP] | Japan | 61-82925 |
| Apr. 9, 1986 | [JP] | Japan | 61-82926 |
| Apr. 9, 1986 | [JP] | Japan | 61-82927 |
| Apr. 11, 1986 | [JP] | Japan | 61-83925 |
| Apr. 25, 1986 | [JP] | Japan | 61-96172 |
| Jun. 10, 1986 | [JP] | Japan | 61-132745 |
| Jun. 10, 1986 | [JP] | Japan | 61-132748 |
| Jun. 23, 1986 | [JP] | Japan | 61-147796 |
| Jun. 23, 1986 | [JP] | Japan | 61-147799 |

[51] Int. Cl.$^4$ .............................................. G02F 1/13
[52] U.S. Cl. ............................. 350/350 S; 350/333; 350/336; 340/784
[58] Field of Search ........................ 350/333, 336, 350 S; 340/765, 784, 805

[56] References Cited

U.S. PATENT DOCUMENTS

| 3,705,310 | 5/1972 | Wild | 350/336 X |
| 4,281,324 | 7/1981 | Nonomura et al. | 350/333 X |
| 4,335,937 | 6/1982 | Takamatsu et al. | 350/336 |
| 4,390,244 | 6/1983 | Hareng et al. | 350/336 X |
| 4,655,561 | 4/1987 | Kanbe et al. | 350/350 S |

FOREIGN PATENT DOCUMENTS

240010A1 10/1987 European Pat. Off. .

Primary Examiner—Stanley D. Miller
Assistant Examiner—Richard F. Gallivan
Attorney, Agent, or Firm—Fitzpatrick, Cella, Harper & Scinto

[57] ABSTRACT

A driving system is disclosed, wherein a potential gradient is formed in a pixel and is utilized for driving. Particularly, there is disclosed an optical modulation apparatus, comprising: a first substrate having thereon a conductor film, and a plurality of transmission lines disposed electrically connected to the conductor film; a second substrate; an optical modulation material disposed between the first and second substrate; and means for supplying a pair of electric signals in mutually opposite transmission directions to neighboring transmission lines among the plurality of transmission lines.

98 Claims, 28 Drawing Sheets

FIG. 10A DATA SIGNAL
FIG. 10B SWITCHING PULSE
FIG. 10C CLOCK PULSE (1)
FIG. 10D CLOCK PULSE (2)

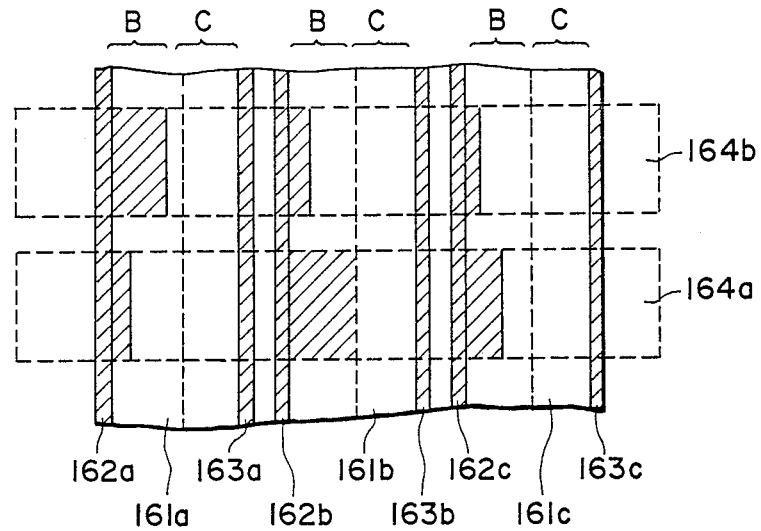
FIG. 18
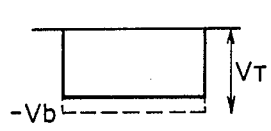
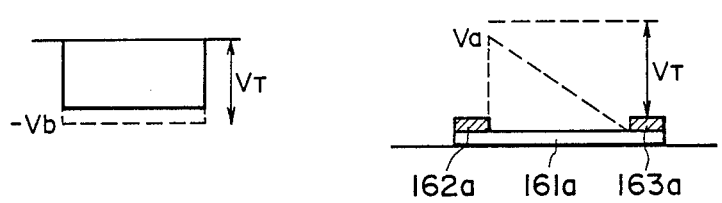
FIG. 19A　　　FIG. 19B
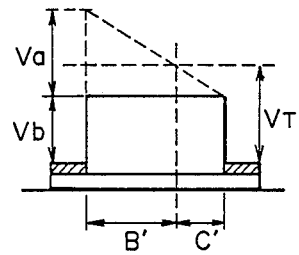
FIG. 19C FIG. 22A
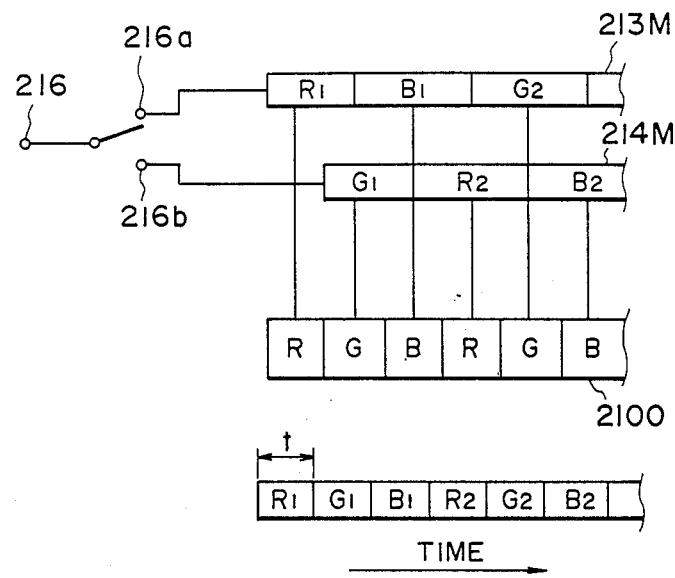
FIG. 22B
FIG. 22C
FIG. 23
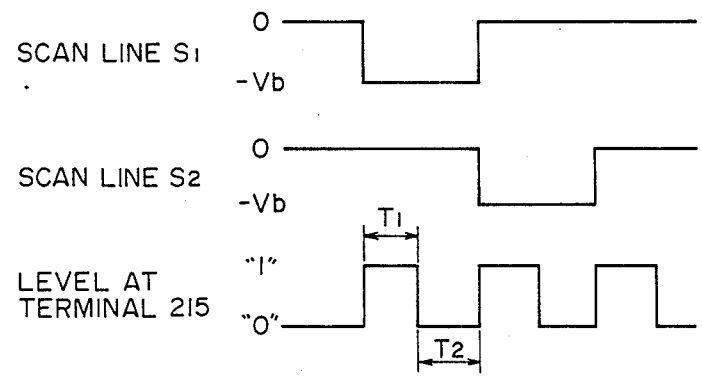

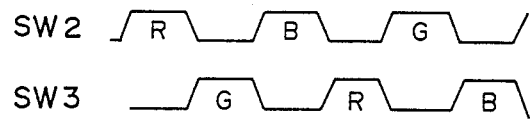
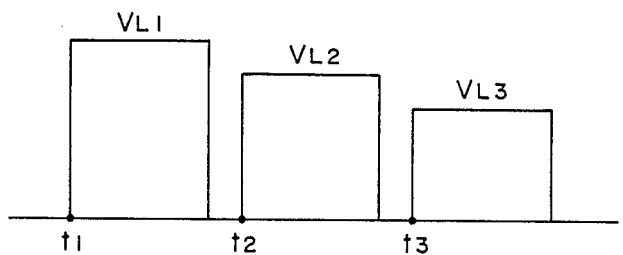
FIG. 26
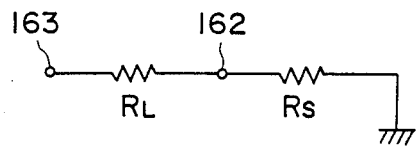
FIG. 27
FIG. 28

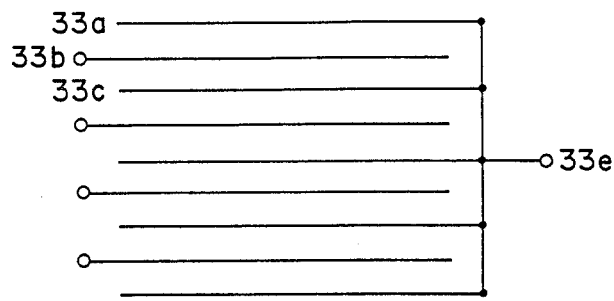
FIG. 33
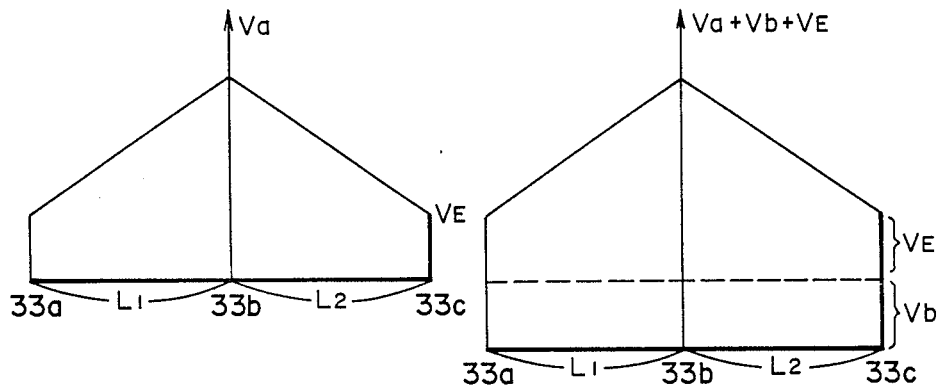
FIG. 34A      FIG. 34B
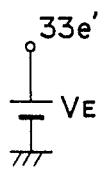      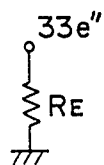
FIG. 35A      FIG. 35B

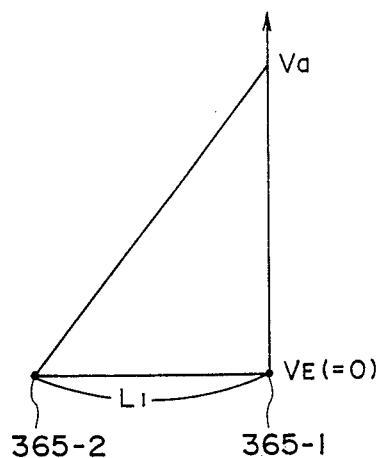 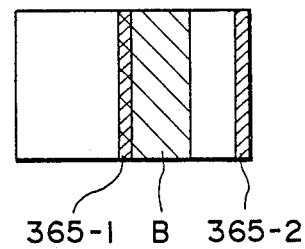
FIG. 38          FIG. 39
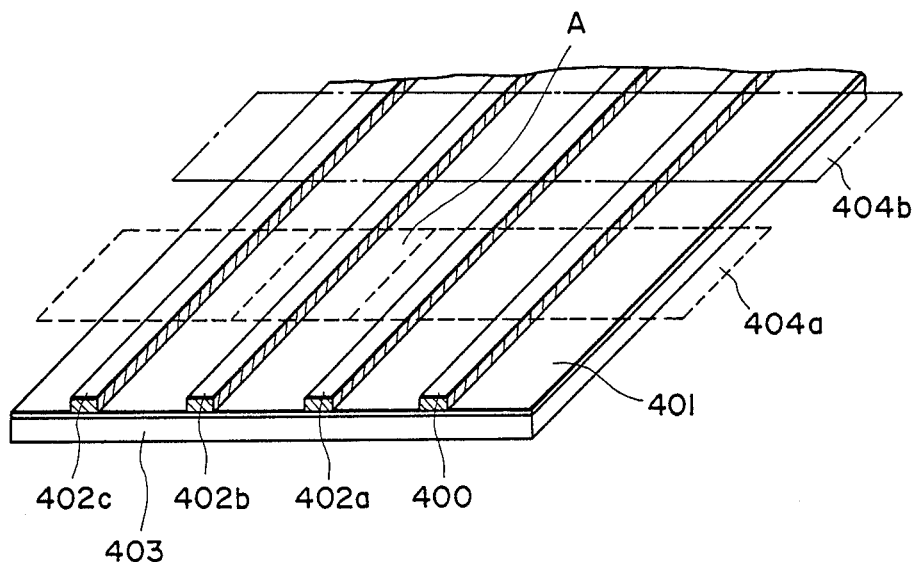
FIG. 40

OPTICAL MODULATION APPARATUS USING FERROELECTRIC LIQUID CRYSTAL AND LOW-RESISTANCE PORTIONS OF COLUMN ELECTRODES

FIELD OF THE INVENTION AND RELATED ART

The present invention relates to a driving apparatus for driving an optical modulation device for use in a display panel, particularly a driving apparatus for driving an optical modulation device adapted to gradational or tonal display using a liquid crystal material, especially, a ferroelectric liquid crystal.

In the conventional liquid crystal television panel of the active matrix driving system, thin film transistors (TFTs) are arranged in matrix corresponding to respective pixels. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of pixels.

However, such a television display panel of the active matrix driving system using a TN liquid crystal uses complicated structure of TFTs requiring a large number of production steps and is accompanied with a difficulty of high production cost. Moreover, there is a further problem that it is difficult to provide a large area of semiconductor film (e.g., of polysilicon, amorphous silicon) constituting TFTs.

On the other hand, a display panel of a passive matrix driving type using a TN liquid crystal has been known as one of a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby cross-talk occurs and a picture with a high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

SUMMARY OF THE INVENTION

A principal object of the present invention is to solve the above mentioned problems.

A more specific object of the present invention is to provide an optical modulation apparatus, particularly a display panel of a high pixel density over a wide area and particularly suitable for a gradational display.

According to the present invention, there is provided an optical modulation system wherein a potential gradient is formed in a pixel and is utilized for driving. Particularly, there is provided an optical modulation apparatus, comprising:

a first substrate having thereon a conductor film, and a plurality of transmission lines disposed electrically connected to the conductor film; a second substrate; an optical modulation material disposed between the first and second substrates; and means for supplying a pair of electric signals in mutually opposite transmission directions to neighboring transmission lines among the plurality of transmission lines.

BRIEF DESCRIPTION OF THE DRAWINGS

FIGS. 6A-6F show examples of gradation signals used in the present invention.

FIGS. 10A-10D are time charts of various pulses applied at the time of introducing data signals;

FIG. 18 illustrates display states of pixels; FIGS. 19A-19C schematically illustrate potential gradients corresponding to the display states;

FIGS. 22A-22C illustrate an embodiment of color display driving; FIG. 23 is a time chart for color display driving;

FIG. 26 is a time chart therefor;

FIG. 27 illustrates voltage waveforms applied to transmission lines; FIG. 28 show an equivalent circuit of connection of a transmission line and a fixed resistor;

FIGS. 33 and 35A through 35B illustrate embodiments of wiring used in the invention;

FIGS. 34A and 34B illustrate other examples of potential gradient used in the invention;

FIG. 38 shows a potential gradient not intended by the invention; FIG. 39 shows a state of pixel obtained thereby;

FIG. 40 shows another type of substrate used in the invention.

DETAILED DESCRIPTION OF THE PREFERRED EMBODIMENTS

As an optical modulation material used in the present invention, a material which shows a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal showing such a property, may be used.

Preferable ferroelectric liquid crystals showing at least two stable states which can be used in the present invention are chiral smectic liquid crystals having ferroelectricity, among which liquid crystals showing chiral smectic C phase (SmC*), H phase (SmH*), I phase (SmI*), F phase (SmF*) or G phase (SmG*) are suitable. These ferroelectric liquid crystals are described in, e.g., "LE JOURNAL DE PHYSIQUE LETTERS" 36 (L-69), 1975 "Ferroelectric Liquid Crystals": "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC, 4-0-(2-methyl)-butylresorcylidene-4'-octylaniline (MBRA8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Figure 1:
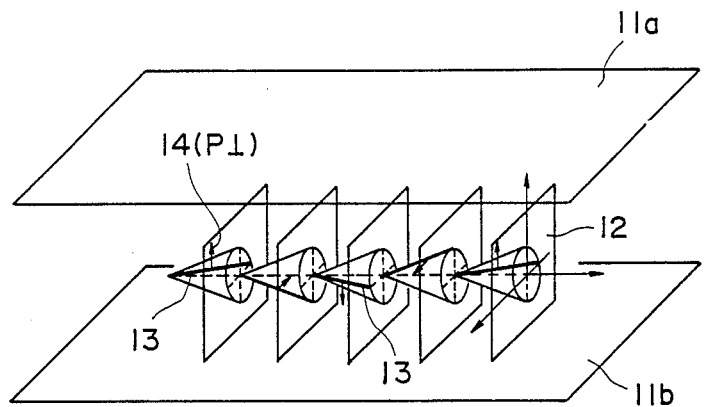
FIGS. 1 and 2 are schematic perspective views each illustrating the operation principle of a ferroelectric liquid crystal device used in the present invention.
Figure 2:
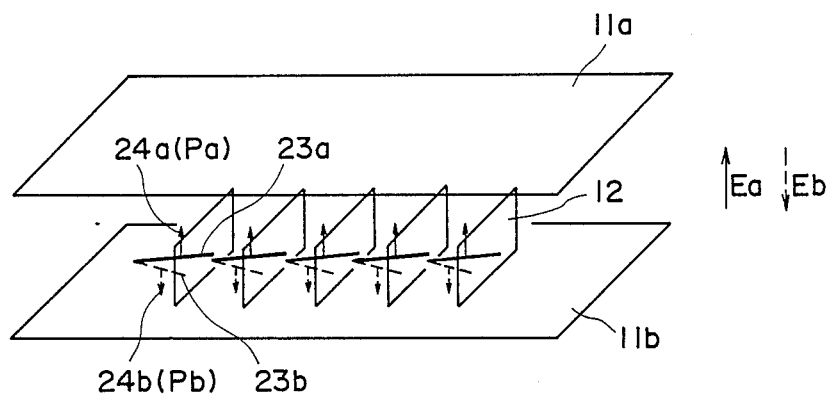

Referring to FIG. 1, there is schematically shown an example of a ferroelectric liquid crystal cell for explanation of the operation thereof. Reference numerals 11a and 11b denote base plates (glass plates) on which a transparent electrode of, e.g., $In_2O_3$, $SnO_2$, ITO (Indium-Tin-Oxide), etc., is disposed, respectively. A liquid crystal of, e.g., an SmC*-phase in which liquid crystal molecular layers 12 are oriented perpendicular to surfaces of the glass plates is hermetically disposed therebetween. Full lines 13 show liquid crystal molecules. Each liquid crystal molecule 13 has a dipole moment ($P_\perp$) 14 in a direction perpendicular to the axis thereof. When a voltage higher than a certain threshold level is applied between electrodes formed on the base plates 11a and 11b, a helical structure of the liquid crystal molecule 13 is unwound or released to change the alignment direction of respective liquid crystal molecules 13 so that the dipole moments ($P_\perp$) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1 $\mu$), the helical structure of the liquid crystal molecules is unwound even in the absence of an electric field whereby the dipole moment assumes either of the two states, i.e., Pa in an upper direction 23a or Pb in a lower direction 24a as shown in FIG. 2. When electric field Ea or Eb higher than a certain threshold level and different from each other in polarity as shown in FIG. 2 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a (bright state) and a second stable state 23b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented in the first stable state 23a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$. A liquid crystal-electrooptical device having a matrix electrode structure in which the ferroelectric liquid crystal of this kind is used is proposed, e.g., in the specification of U.S. Pat. No. 4367924 by Clark and Lagerwall.

Hereinbelow, an embodiment of the display device used in the present invention will be explained with reference to FIG. 3.

Figure 3:
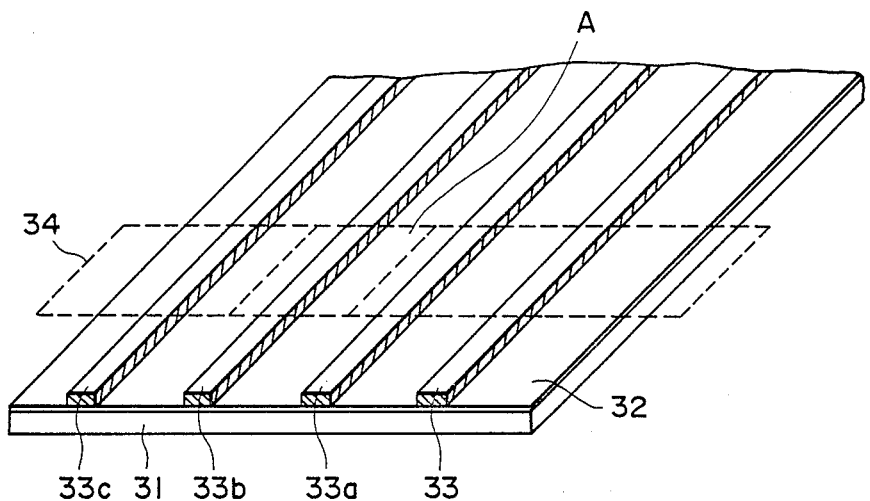
FIG. 3 is a partial perspective view of one substrate used in the present invention.

Referring to FIG. 3, a glass substrate 31 has thereon a display conductor film 32, and transmission electrodes 33 disposed on the conductor film 32 in parallel with each other at equal spacings. The display conductor film 32 has a region A defining a pixel. Facing the display conductor film 32, a counter conductor film (counter electrode) is disposed on the other substrate (not shown) at a region on the other substrate corresponding to the above mentioned region A. An optical modulation material as described above is sandwiched between the display conductor film 32 and the counter electrode.

Figure 8A:
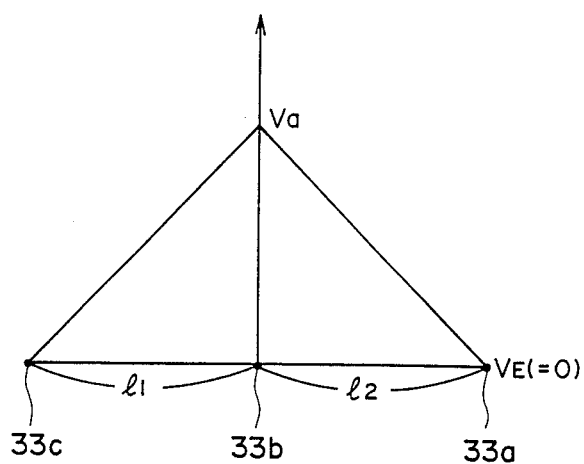
FIGS. 8A and 8C are explanatory views showing potential gradients used in the present invention.

In the liquid crystal optical device, a signal voltage is applied to a transmission electrode 33 to provide a potential gradient along the extension of the display conductor film 32, whereby a gradient in potential difference is produced in the electric field between the conductor film 32 and the counter electrode 34. In this instance, when the transmission electrodes 33a and 33c are connected to a reference potential $V_E$ (e.g., 0 volt), and a prescribed signal voltage Va is applied to a transmission electrode 33b, a voltage difference or slope of Va is developed in a length $l_1$ between the transmission electrodes 33a and 33b and between the electrodes 33b and 33c, respectively, of the extension of the conductor film 32 as shown in FIG. 8A. At this time, when the counter electrode 34 is supplied with a voltage of −Vb having such a magnitude that Va+Vb>Vth (inversion threshold voltage of the ferroelectric liquid crystal used), the portion or region of the liquid crystal contacting the lengths $m_1$ and $m_2$ of the conductor film 32 is supplied with a voltage (at the maximum of Va+Vb) exceeding the inversion threshold voltage Vth to be inverted, e.g., from the bright state to the dark state. As a result, according to the present invention, a gradation is displayed at each pixel by applying various Vb according to given gradation data for the respective pixels. In this instance, the voltage signal of −Vb can be modulated depending on given gradation data with respect to the voltage value (peak value), with respect to the pulse duration, or with respect to the number of pulses to control the resultant gradation.

In the present invention, prior to the application of the above mentioned gradation signal, a pixel concerned is subjected to an erasure step for being brought to either one of the bright and dark states, and then an inversion voltage for inverting the state is applied to the ferroelectric liquid crystal while being controlled depending on given gradation data.

The present invention is further explained based on a preferred specific embodiment.

Referring to FIG. 3, an about 200 Å-thick transparent SnO₂ conductor film was formed by sputtering as a display conductor film on a glass substrate 31. The sheet resistivity of the SnO₂ film was $10^5 \Omega/\square$. Then, Al was vapor-deposited under vacuum in a thickness of 1000 Å on the SnO₂ film and patterned to form a plurality of transmission electrodes 33 as shown in FIG. 3. In this example, the spacing between adjacent transmission electrodes was set to 230 μ. The Al layer formed in the above described manner provided a low resistivity of about $0.4 \Omega/\square$ and formed into a width of about 20 μ. On the other hand, on the counter substrate, a transparent ITO (indium-tin-oxide) film was formed as a counter electrode so as to cover the region A. The ITO film showed a sheet resistivity of about $20\Omega/\square$.

On the two substrates prepared in the above described manner, an about 500 Å-thick polyvinyl alcohol layer was formed and subjected to a rubbing treatment.

Then, the two substrates were disposed to face each other and secured to each other with a controlled gap of about 1 μ to form a cell, into which a ferro-electric liquid crystal composition consisting mainly of p-n-octyloxybenzoic acid-p'-(2-methylbutyloxy)-phenyl-ester and p-n-nonyloxybenzoic acid-p'-(2-methylbutyloxy)phenyl-ester, was injected. The region or pixel A (as shown by A in FIG. 3) at which the display conductor film 32 and the counter electrode 34 overlapped each other had a size of 230μ×230μ, and provided a capacitance of about 3 pF after the injection of the liquid crystal. The width of the pixel A was given as $l_1/2 + l_2/2$.

On both sides of the liquid crystal cell thus prepared, a pair of polarizers were disposed in the form of cross nicols, and the optical characteristics were observed.

Figure 4:
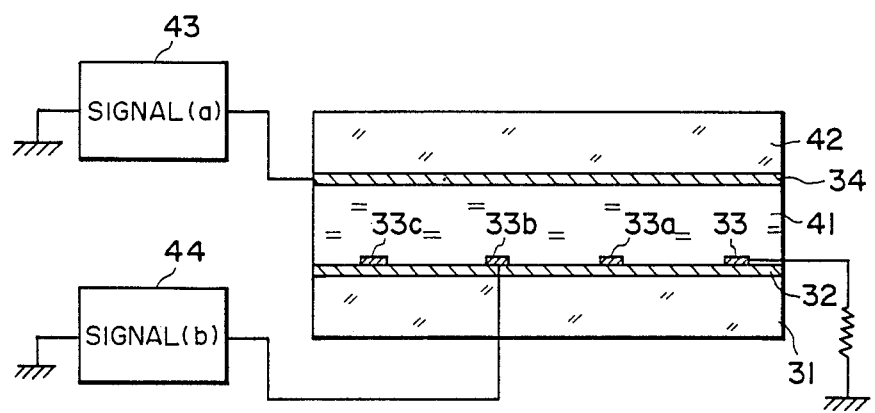
FIG. 4 is a schematic sectional view of an optical modulation device according to the present invention.
Figure 5:
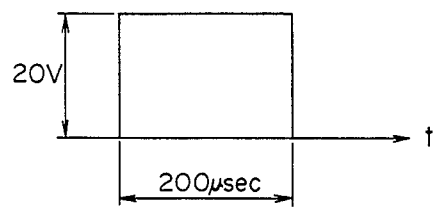
FIG. 5 shows an example of scanning signal.
Figure 6A:
Figure 6B:
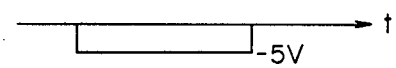
Figure 6C:
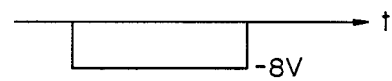
Figure 6D:
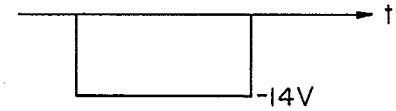
Figure 6E:
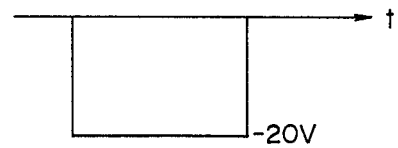

FIG. 4 schematically illustrates a method of applying electric signals to a liquid crystal cell which includes a counter electrode 34, a counter substrate 42, and a liquid crystal layer 41, a ferroelectric liquid crystal, preferably a chiral smectic liquid crystal disposed under bistability condition, disposed between the counter substrate and the substrate 41 shown in FIG. 3, and FIGS. 5 and 6A–6E show examples of electric signals applied. FIG. 5 shows a waveform of SIGNAL(a) generated by a driver circuit 43 in FIG. 4 and FIGS. 6A–6F show waveforms of SIGNAL(b) generated by a driver circuit 44 in FIG. 4.

Now, a pulse of −12V, 200 μsec as SIGNAL(a) and a pulse of 8V, 200 μsec as SIGNAL(b) were applied in phase with each other in advance in an erasure step. These pulses are referred to as erasure pulses. Then, the liquid crystal was switched or brought to the first stable state, thereby to render the whole pixel A "bright" as the polarizers were arranged in that manner. At this state, various pulses as shown in FIGS. 6A–6E were applied respectively in phase with the pulse shown in FIG. 5 applied from the driver circuit 43, whereby the pixel A provided optical states as shown in FIGS. 7A–7D.

Figure 7A:
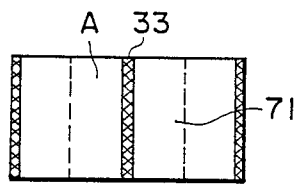
FIGS. 7A-7D show schematic views showing bright-to-dark gradational states of a pixel obtained correspondingly.
Figure 7B:
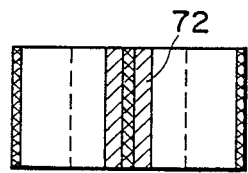
Figure 7C:
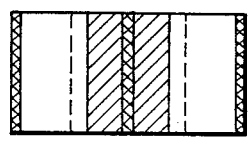
Figure 7D:
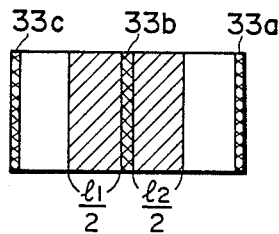

More specifically, for pulse voltage of −2V (corresponding to FIG. 6A) and −5V (corresponding to FIG. 6B), no change occurred from the bright state (corr. to FIG. 7A). For a pulse voltage of −8V (corr. to FIG. 6C), a portion of the liquid crystal in the vicinity of the transmission electrode 33 is switched to the dark state 72 (corr. to FIG. 7B). Further, when the pulse voltage is changed to −14V (corr. to FIG. 6D), the region of the dark state 72 is enlarged (corr. to FIG. 7C), and for a voltage pulse of 20V (corr. to FIG. 6E), the entirety of the pixel A is switched to the dark state (corr. to FIG. 7D). In this way, a gradational image may be formed.

In the present invention, it is possible to use a transmission electrode of a metal, such as silver, copper, gold, or chrome instead of the aluminum (Al) transmission electrode used in the above embodiment, preferably having a sheet resistivity of $10^2 \Omega/\square$ or below. Further, as the conductor film 32 provided with a potential gradient, a transparent conductor film having a sheet resistivity of $10^2 \Omega/\square - 1M\Omega/\square$.

Next, an embodiment of the apparatus according to the present invention will be explained.

Figure 9:
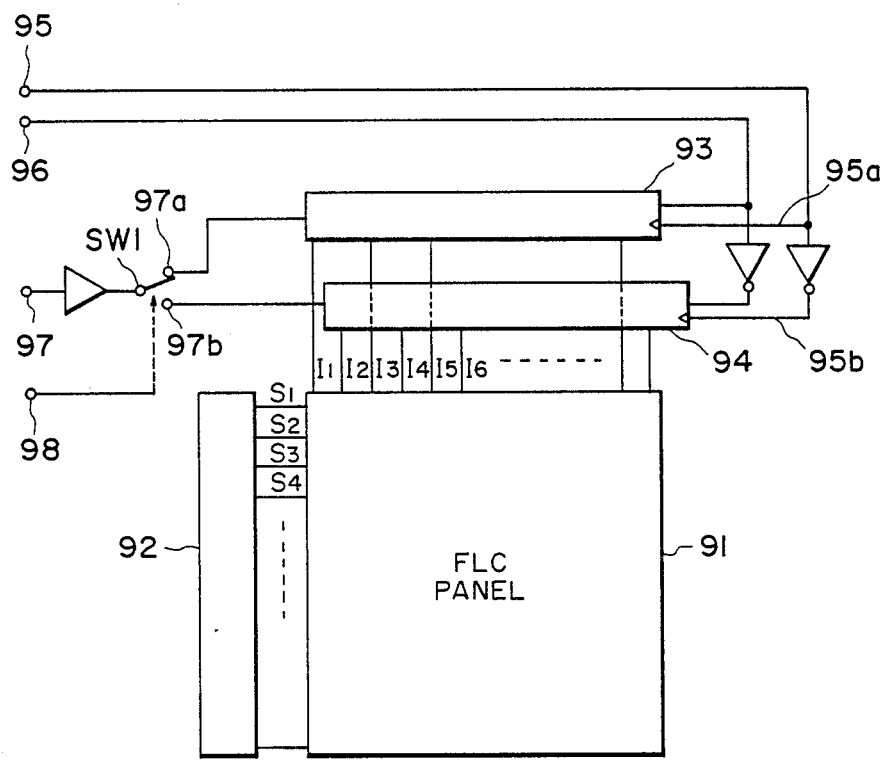
FIG. 9 is a drive circuit diagram used in the present invention.

FIG. 9 shows an optical modulation apparatus, comprising:

an optical modulation device comprising a first substrate having thereon a conductor film, and a plurality of first electrodes disposed electrically connected to the conductor film; a second substrate having thereon a plurality of second electrddes; and an optical modulation material disposed between the first and second substrates;

a scanning line driver circuit comprising means for supplying a scanning line to the second electrodes; and a data line driver circut comprising means for supplying data signals to odd-numbered electrodes among the first electrodes in phase with the scanning signal and means for supplying data signals to even-numbered electrodes among the first electrodes in phase with the scanning signal.

The optical modulation apparatus shown in FIG. 9 comprises an FLC (ferroelectric liquid crystal) panel 91; a scanning line driver circuit 92 for supplying scanning signals to the FLC panel 91 through scanning lines $S_1, S_2, S_3, \ldots$; an odd-numbered data driver circuit 93 having memories for data corresponding to the number of odd-numbered data lines $I_1, I_3, I_5, \ldots$ to be supplied to pixels on one scanning line; and an even-numbered data driver circuit 94 having memories for data corresponding to the number of even-numbered data lines $I_2, I_4, I_6, \ldots$ to be supplied to pixels on one scanning line. Further a clock terminal 95 is provided for supplying clock pulses to the odd-numbered data driver circuit 93 and the even-numbered data driver circuit 94, and at rises of the clock pulses, pixel data may be taken into the memories of the data driver circuits 93 and 94. An input terminal 96 is provided for controlling the output level and supplies a signal of level "1" at which all the outputs from the daaa driver circuits 93 and 94 are held at a reference potential, and a signal of level "0" at which a level of output corresponding to a data signal is issued. A data input terminal 97 is provided for supplying data signals through a switch SW1. The switch SW1 is connected to a terminal 97a when the control level of a control input from a terminal 98 is "1" and connected to a terminal 97b when the control level is "0".

Data signals shown in FIG. 10B are serially supplied to the data input terminal. Among the time signals, odd-numbered signals including first (1), third (3), fifth (5), ..., 2n+1-th (n=0, 1, 2, 3, ...) signals each allotted a period of "t" are stored in the memories in the odd-numbered data driver circuit 93, and even-numbered signals including second (2), fourth (4), sixth (6), ..., 2n-th (n=1, 2, 3, ...) signals each allotted a period of t are stored in the memories in the even-numbered data driver circuit 94. In parallel with the above, switching pulses shown in FIG. 10B supplied to the control input terminal 98 alternately assume the levels of "1" and "0" for the same duration of t as the data signal and in phase with the data signals, so that the SW1 is changed over corresponding to the level. Accordingly, by setting the level of the control input terminal 98 to "1" at the time of an odd-numbered data signal and to "0" at the time of an even-numbered data signal, the odd-numbered data signal is supplied to the odd-numbered data driver circuit 93 and the even-numbered data signal is supplied to the even-numbered data driver circuit 94.

Figure 11:
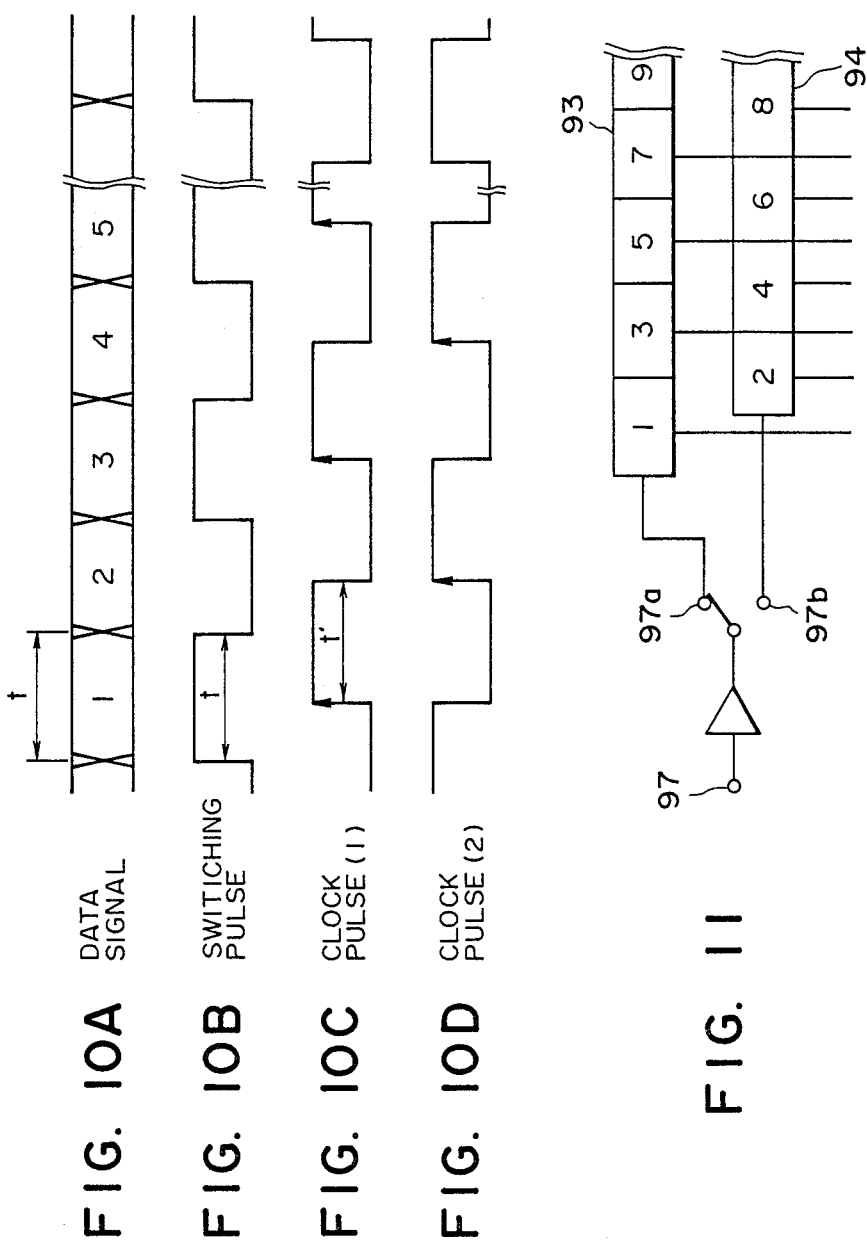
FIG. 11 is an explanatory view showing a state where supplied data signals are memorized.

FIG. 10C shows clock pulses (1) supplied from the terminal 95 through a point 95a, and FIG. 10D show clock pulses (2) supplied through a point 95b. Then, when the data signals are supplied to the odd-numbered driver circuit 93 and the even-numbered driver circuit 94, respectively, in the manner described above, the odd-numbered and even-numbered data signals are stored in the memories of the odd-numbered data driver circuit 93 and the even-numbered data driver circuit 94 at the time of rise of the clock pulses (1) and (2), respectively. As a result, as shown in FIG. 11, odd-numbered (1st, 3rd, 5th, data signals are serially memorized in the odd-numbered data driver circuit 93, and even-numbered (2nd, 4th, 6th, ...) data signals in the even-numbered data driver circuit 94. Then, after data signals for one scanning line are stored in te memories of the data driver circuits 93 and 94, odd-numbered data and even-numbered data are supplied in different phases to the odd-numbered lines and the even-numbered lines of the data lines $I_1, I_2, I_3, \ldots$ shown in FIG. 9. Further, at this time, a scanning selection signal at a level of $-V_b$ is sequentially supplied to the scanning lines $S_1, S_2, \ldots$ from the scanning line driver circuit 92 in phase with the data signals at a level of $V_a$. As a result, a selected pixel on a selected (or scanned) scanning line is supplied with a voltage level of $V_a+V_b$ at the maximum and the ferroelectric liquid crystal thereat is inverted, e.g., from the first stable state corresponding to a white display state to the second stable state corresponding to a black display state. The time of respective signals for this operation are shown in FIG. 12.

In this instance, a pixel on a scanning line is provided with a potential gradient, so that if the voltage level $V_a$ of a data signal is set corresponding to a gradation data, the pixel is brought to a mixed state comprising a white display state and a black display state as shown in FIG. 7, thus displaying a gradation.

Figure 12:
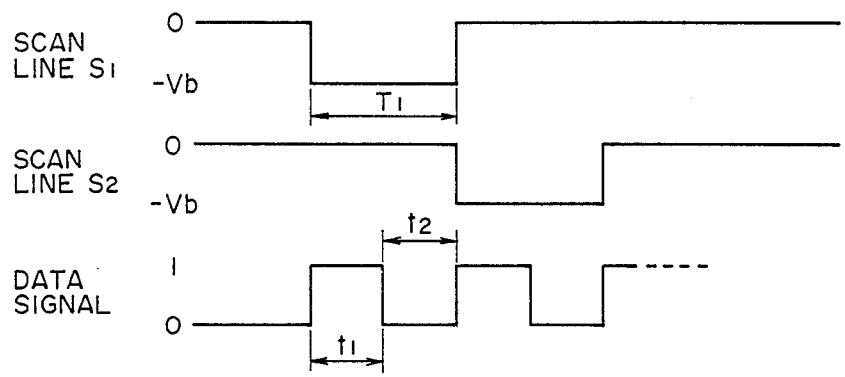
FIG. 12 is a time chart of various signals at the time of supplying data signals.

As shown in FIG. 12, a scanning selection signal having a voltage level of $-V_b$ and a duration of $T_1$ is sequentially applied to scanning lines $S_1, S_2, \ldots$, and a unit duration $T_1$ comprises a first period $t_1$ and a second period $t_2$.

In the first period $t_1$, the level of he output level-controlling input terminal 96 is set to "1", whereby the odd-numbered outputs from the odd-numbered driver circuit 93 are all brought to a reference potential $V_r$, and the even-numbered outputs from the even-numbered driver circuit 94 are made output voltages $V_a$ corresponding to given data signals. Further, in the second period $t_2$, the level of the output level-controlling input terminal 96 is set to "0", whereby the even-numbered outputs from the even-numbered driver circuit 94 are all brought to the reference potential $V_r$, and the outputs from the odd-numbered circuit 93 are made output voltages $V_a$ corresponding to given gradation data.

Figure 13:
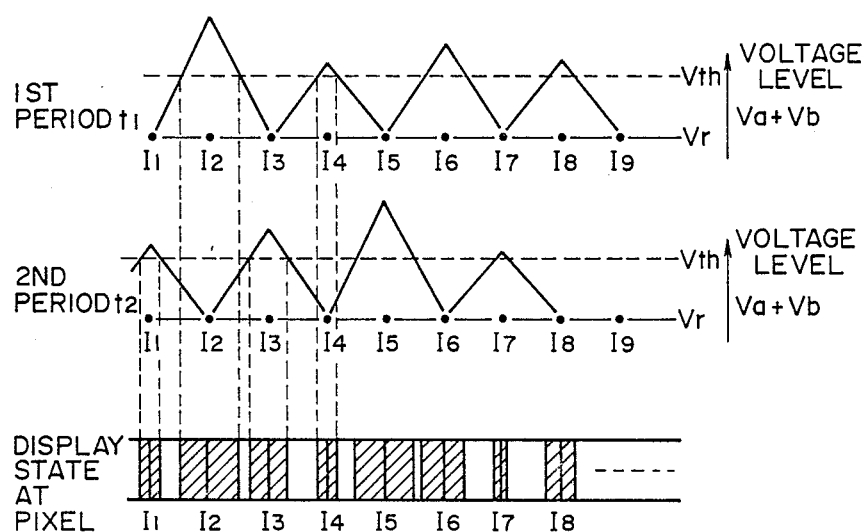
FIG. 13 is an explanatory view showing a potential gradient appearing at pixels on one scanning line and the resultant display states.

FIG. 13 schematically shows potential gradients appearing at pixels on a scanning line in the first period $t_1$ and in the second period $t_2$, and display states appearing at the pixel at that time. Referring to FIG. 13, in the first period $t_1$, outputs $V_a$ are supplied corresponding to even-numbered data signals, whereby only regions of the ferroelectric liquid crystal supplied with a voltage $V_a+V_b$ exceeding the threshold voltage $V_{th}$ at the even-numbered pixels are inverted (hatched portions in the figure corresponding to $I_2, I_4, \ldots$). Also, in the second period $t_2$, outputs $V_a$ are supplied corresponding to odd-numbered data signals, whereby only regions of the liquid crystal supplied with a voltage $V_a+V_b$ exceeding the threshold $V_{th}$ are inverted (hatched portions in FIG. 13 corresponding to $I_1, I_3, I_5, \ldots$). As a result, even-numbered gradation data are written in the first period $t_1$ and odd-numbered gradation data are written in the second period $t_2$, whereby pixels on one scanning line are written corresponding to gradation data. By repeating such a writing operation for each scanning line, a gradational image of one whole picture may be formed. Prior to the first writing period $t_1$ and the second writing period, the pixels on a concerned scanning line are uniformly brought to, e.g., a white state depending on the first stable state of the ferroelectric liquid crystal.

Figure 14:
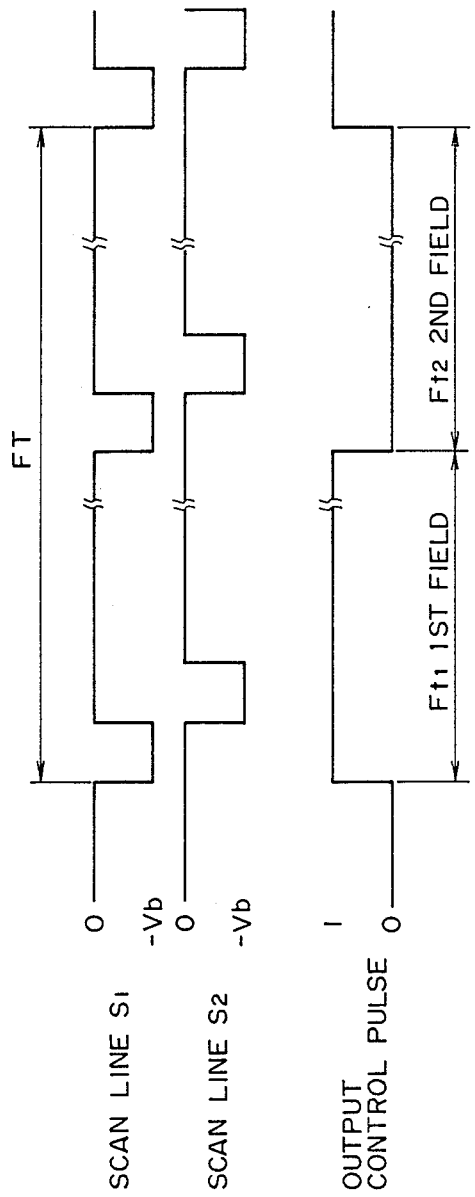
FIG. 14 is another time chart of signals issuing data signals.

FIG. 14 shows another embodiment of gradational display driving scheme. After data signals for one scanning line are stored in the memories of the data driver circuits 93 and 94 as shown in FIG. 11, the level of the output level-controlling input terminal 96 is changed following a time chart shown in FIG. 14. In this instance, a prescribed period of, e.g., one frame time FT, is divided into a first field $Ft_1$ and a second field $Ft_2$ according to the NTSC system as a display standard for video signals. In the first field $Ft_1$, the level of the control terminal 96 is set to "1", so that data signals Va are supplied to even-numbered data lines $I_2$, $I_4$, . . . to write in pixels corresponding to the even-numbered data lines among the pixels constituting one frame. At this time, the odd-numbered data lines are placed at a reference potential Vr. Then, in the second field $Ft_2$, the level of the control terminal 96 is set to "0", so that data signals Va are supplied to the odd-numbered data lines $I_1$, $I_3$, . . . to write in pixels corresponding to the even-numbered data lines among the pixels of one frame. At this time, the even-umbered data lines are at the reference potential Vr. Further, prior to the writing in the first field $Ft_1$ and the second field $Ft_2$, pixels on a scanning line concerned are cleared into, e.g., a white state.

The driving apparatus according to the present invention can be also applicable to a color gradation display or a color binary display by using a color filter in addition to the white-and-black gradational display as described above. Further, it is also applicable to a white-and-black binary display. In case of a binary display, a shift register of a flipflop type may for example be used as a driver circuit. In case of a gradational display, an analog memory of sample-and-hold type as shown in FIG. 15 may be used.

Figure 15:
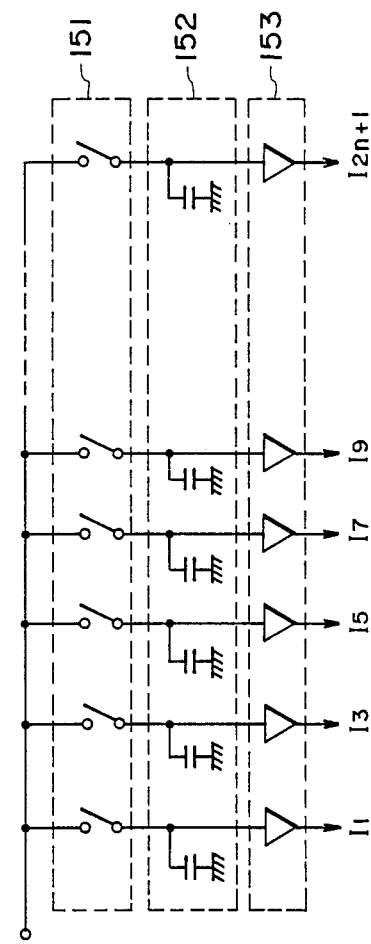
FIG. 15 is a data driver circuit using an analog-type memory.

FIG. 15 shows an embodiment of a data driver circuit, e.g., the odd-numbered data driver circuit, using an analog-type memory. A similar circuit is also applicable to the even-numbered driver circuit 94. The driver circuit comprises a switching circuit 151, sample-and-hold capacitors 152, and a buffer circuit 153 corresponding to the respective data lines. It is preferred that the switching circuit 151 is a gate circuit including field effect transistors.

As described above, according to the present invention, a gradational display is effected by applying at least two times of writing operation to data or information electrodes.

The present invention is also applicable to a twisted nematic liquid crystal, a quest-host liquid crystal, etc., in addition to a ferroelectric liquid crystal as described above. It is however suitable that a ferroelectric liquid crystal, particularly a ferroelectric liquid crystal having at least two stable states, is used.

Figure 16:
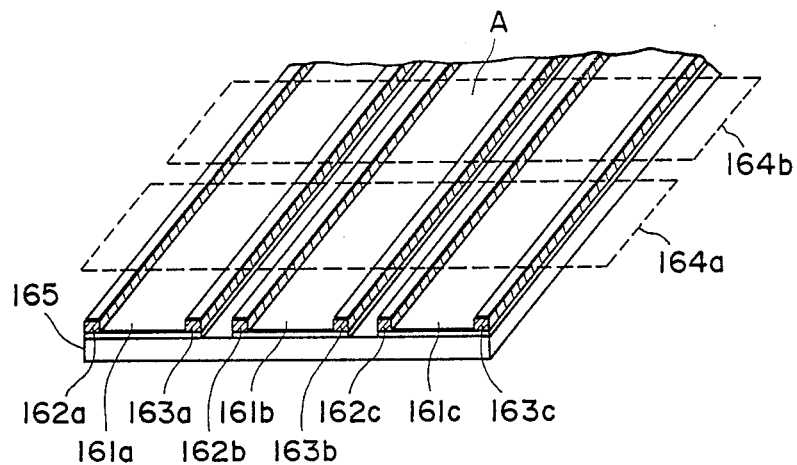
FIG. 16 is a perspective view of an electrode structure used in the invention.
Figure 17A:
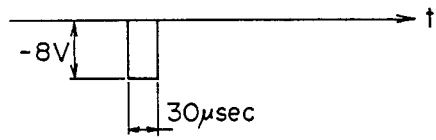
FIGS. 17A-17E show data signal pulses corresponding to gradation data.
Figure 17B:
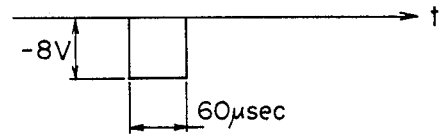
Figure 17C:
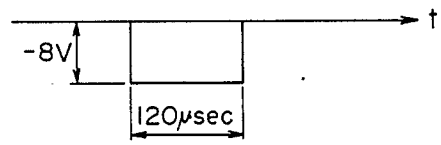
Figure 17D:
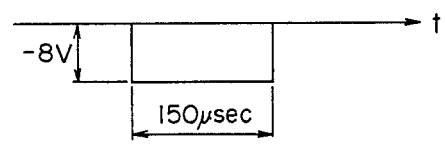
Figure 17E:
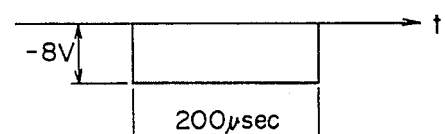

FIG. 16 shows a ferroelectric liquid crystal optical device, a display panel, to which another embodiment of the gradational display of the present invention according to a matrix driving scheme may be applied.

Referring to FIG. 16, a glass substrate 165 has thereon a plurality of stripe conductor films 161 (161a, 161b, 161c, . . . ) and low conductivity transmission electrodes 162 (162a, 162b, 162c, . . . ) and 163 (163a, 163b, 163c, . . . ) disposed on both sides of each stripe conductor film 161 along the longitudinal direction thereof. Opposite the substrate 165, a counter substrate having thereon stripe electrodes 164 (164a, 164b, . . . ) is disposed so that the stripe electrodes 164 cross the stripe electrodes 161 with a ferroelectric liquid crystal disposed therebetween. At each crossing region between the oppositely disposed stripe electrodes, a pixel A is defined.

In a specific example, a ferroelectric liquid crystal device as shown in FIG. 16 was prepared in the following manner.

Referring to FIG. 16, an about 200 Å-thick transparent $SnO_2$ conductor film was formed as a display conductor film 161 by sputtering in the form of stripes. The sheet resistivity of the $SnO_2$ film was $10^5 \Omega/\square$. Then, Al was vapor-deposited under vacuum in a thickness of 1000 on the stripe $SnO_2$ film 161 and again patterned to form transmission electrodes 162 and 163 on each stripe of the $SnO_2$ film. In this example, the spacing between the transmission electrodes 162 and 163 on each $SnO_2$ stripe was set to 190 $\mu$. The sheet resistivity of the transmission electrodes 162 and 163 was about $0.4\Omega/\square$ and the width thereof was made about 20 $\mu$. On the other hand, on the counter substrate, a transparent ITO conductor film was formed a counter electrode 164 so as to cover the region A. The ITO film showed a sheet resistivity of about $20\Omega/\square$.

On the two substrates prepared in the above described manner, an about 500 Å-thick polyvinyl alcohol layer was formed and subjected to a rubbing treatment.

Then, the two substrates were disposed to face each other and secured to each other with a controlled gap of about 1 $\mu$ to form a cell, into which a ferro-electric liquid crystal composition consisting mainly of p-n-octyloxybenzoic acid-p'-(2-methylbutyloxy)-phenyl-ester and p-n-nonyloxybenzoic acid-p'-(2-methylbutyloxy)phenyl-ester, was injected. The region or pixel A (as shown in FIG. 16) at which the display conductor film 161 and the counter electrode 164 overlapped each other had a size of $190\mu \times 230\mu$, and provided a capacitance of about 3 pF after the injection of the ferroelectric liquid crystal.

On both sides of the liquid crystal cell thus prepared, a pair of polarizers were disposed in the form of cross nicols, and the optical characteristics were observed.

By using a display panel as shown in FIG. 16, an embodiment of the driving method according to the present invention is applied in the following manner to form a gradational picture.

First, a scanning selection signal pulse is sequentially applied to stripe conductor films 164a, 164b, . . . In this instance, the scanning selection signal should preferably be a voltage pulse somewhat lower than the inversion threshold voltage of the ferroelectric liquid crystal.

On the other hand, as gradation signals for providing a gradational image, voltage signal pulses as shown in FIGS. 6A-6E or FIGS. 17A-17E corresponding to given gradation data are applied to one side of stripe transmission electrodes 162a, 162b, 162c, . . . in phase with the above scanning selection pulse, thereby to write in pixels on a scanning line depending on the given gradation data. At this time, stripe transmission electrodes 163a, 163b, 163c, . . . on the other side are all connected to a reference potential supply (e.g., 0V). Further, at this stage in this instance, it is preferred that the maximum value of the scanning signal pulse and gradation signal pulses are so set that the maximum region of writing (region B in FIG. 18) on the stripe electrodes 161a, 161b, 161c, . . . is about one half of the width of the stripe electrodes. The reason therefor is explained with reference to FIGS. 19A–19C.

For example, a scanning signal pulse is set to have a peak value of $-Vb$, the magnitude of which is a little smaller than the threshold voltage ($V_T$) of the liquid crystal so that:

$Vb = V_T - B$, and $0 < \beta < V_T$, desirably $\beta \lesssim V_T/2$.

In this case, because $Vb < V_T$, the scanning pulse alone is not sufficient for writing.

Further, as the maximum of the gradation signal pulse ($Va.max$) cannot be made larger than $V_T$ so as not to cause crosstalk. Thus, $Va.max = V_T - a$, and $0 < a < V_T$, desirably $a \lesssim V_T/2$.

Then, the voltage applied as a combination of the scanning signal pulse and the gradation signal pulse is as shown in FIG. 19C. Thus, a region $C'$ where the voltage applied to the liquid crystal does not exceed $V_T$ is always present, and the region $C'$ cannot be an effective region of a pixel because the inversion of the liquid crystal does not occur therein. It follows that the effective aperture area (or ratio) is decreased by the area of the region $C'$. However, if the maximum value of the combination of a scanning signal pulse and a gradation signal pulse is set so as to be approximately the same as the threshold voltage of the ferroelectric liquid crystal in the vicinity of the center of a pixel, the effective aperture ratio can be remarkably increased.

More specifically, this is effected in the following manner.

First of all, referring to FIG. 19C, Va and Vb are selected so as to satisfy $B' = C'$. This is for satisfied by the following combination:

$Vb = V_T - 0.25 \ V_T = 0.75 \ V_T$, and $Va.max = V_T - 0.5 \ V_T = 0.5 \ V_T$.

The following combination may also be possible:

$Vb = V_T - 0.5 \ V_T = 0.5 \ V_T$ $Va.max \approx V_T$.

If the scanning signal pulse Vb and the maximum voltage Va.max of the gradation signal pulses are selected in the above manner, a gradation signal is written in a half region (region B) of a stripe conductor film 161 in a first stage as shown in Figure 18. Then, writing in the remaining region C is effected in following manner.

A scanning signal pulse and gradation signal pulses are selected so as to satisfy the same conditions as above. Thus, a scanning signal pulse is sequentially applied to the stripe electrodes 164a, 164b, . . . , and in phase with each scanning signal pulse, gradation signal pulses are applied to the stripe electrodes 163a, 163b, 163c, . . . At this time, the stripe electrodes 162a, 162b, 162c . . . are all connected to a reference potential supply (e.g., 0V). In this way, gradation signals are also written into region C.

In case where the driving method according to the present invention is applied to a gradational display system, an erasure step for bringing each pixel to either one of the dark and bright states is placed prior to application of the above gradation signals, and then inversion voltages are applied while being controlled depending on given gradation data. As gradation signals, those having a number of pulses corresponding to given gradation data can be used in being controlled depending on given gradation data. As gradation signals, those having a number of pulses corresponding to given gradation data can be used in addition to those shown in FIGS. 6 and 17.

In another preferred embodiment, a scanning signal pulse is sequentially applied to stripe transmission electrodes 162a, 162b, 162c, and in phase with the scanning pulse, data signals, e.g., those having a pulse duration, a peak value or a number of pulses, corresponding to given gradation data are applied to stripe electrodes 164a, 164b, . . . (first field); and then a scanning signal pulse is sequentially applied to stripe transmission electrodes 163a, 163b, 163c. . . on the other side, and in phase with the scanning signal pulse, data signals as described are applied to the stripe electrodes 164a, 164b . . . (second field), whereby one frame of gradational picture can be formed. When this driving method is applied to a gradational display, prior to application of data signals, it is necessary that pixels on a scanning line which has been supplied with a scanning signal pulse are uniformly brought to one display state based on the first stable state or the second stable state of the ferroelectric liquid crystal. Further, the transmission electrodes 163a, 163b, 163c . . . during the first field operation and the transmission electrodes 162a, 162b, 162c . . . during the second field operation, are respectively connected to a reference potential supply (e.g., 0V).

Figure 20:
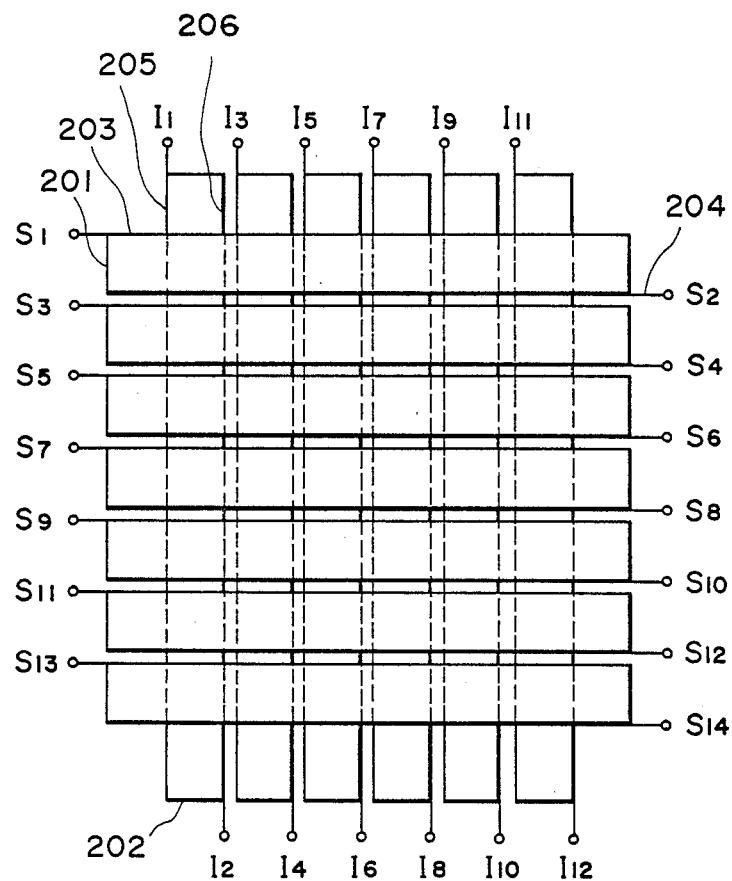
FIG. 20 is a plan view of another electrode structure used in the invention.

FIG. 20 shows another embodiment of the present invention. The liquid crystal optical device shown in FIG. 20 comprises a plurality of stripe conductor films 201 on one substrate, and a plurality of stripe conductor films 202 disposed on the other substrate opposite to and intersecting with the stripe conductor films 201 with a ferroelectric liquid crystal disposed therebetween. Further, on both sides of each of the stripe conductor films 201 and 202 are disposed low-resistivity transmission electrodes 203, 204 and 205, 206, respectively.

The liquid crystal optical device of FIG. 20 is driven in the following manner according to the present invention. Terminals $S_1$, $S_3$, $S_5$, . . . of transmission electrodes 203 and terminals $S_2$, $S_4$, $S_6$ . . . of transmission electrodes 204 are respectively connected to a scanning signal generator circuit (not shown). Terminals $I_1$, $I_3$, $I_5$ . . . of transmission electrodes 205 and terminals $I_2$, $I_4$, $I_6$ . . . of transmission electrode 206 are respectively connected to a data signal generator circuit (not shown). In a first field, a scanning signal pulse is sequentially applied to the odd-numbered scanning lines $S_1$, $S_3$, $S_5$ . . . and data signals are applied to the odd-numbered data lines $I_1$, $I_3$, $I_5$ . . . in phase with the scanning signal puse. At this time, the even-numbered scanning lines $S_2$, $S_4$, $S_6$ . . . and the even-numbered data lines $I_2$, $I_4$, $I_6$ . . . are respectively connected to a reference potential supply. Then, in the second field, a scanning signal pulse is sequentially applied to the odd-numbered scanning lines $S_1$, $S_3$, $S_5$ . . . and data signals are applied to the even-numbered data lines $I_2$, $I_4$, $I_6$ . . . in phase with the scanning signal pulse. At this time, the even-numbered scanning lines $S_2$, $S_4$, $S_6$ . . . and the odd-numbered data lines $I_2$, $I_4$, $I_6$, . . . are respectively connected to a reference potential supply. In a subsequent third field, a scanning signal pulse is sequentially applied to the even-numbered scanning lines $S_2$, $S_4$, $S_6$ . . . and data signals are applied to the odd-numbered data lines $I_1$, $I_3$, $I_5$, . .

. in phase with the scanning signal pulse. At this time, the odd-numbered scanning lines $S_1$, $S_3$, $S_5$, ... and the even-numbered data liens $I_2$, $I_4$, $I_6$, ... are respectively connected to a reference potential supply. Further, in a fourth field, a scanning signal pulse is sequentially applied to the even-numbered scanning lines $S_2$, $S_4$, $S_6$, ..., and data signals are applied to the even-numbered data lines $I_2$, $I_4$, $I_6$, ... in phase with the scanning signal pulse. At this time, the odd-numbered scanning lines $S_1$, $S_3$, $S_5$, ... and the odd-numbered data lines $I_1$, $I_3$, $I_5$, ... are respectively corrected to a reference potential supply. As the data signals applied in this instance, the gradation signals explained hereinabove may preferably be used.

As a result, in the driving method according to the present invention, pixels after an erasure step are provided with a potential gradient in the conductor film on the scanning signal side and also a potential gradient in the conductor film on the data signal side, a ferroelectric liquid crystal in a pixel is supplied with a gradient in potential difference as a combination of the potential gradients on both sides, whereby a display picture with a large number of gradation can be formed.

In the present invention, the transmission electrodes 162, 163, 203, 204 and 205 may be formed of another, metal such as silver, copper, gold or chrome in addition to aluminum (Al) used in the above embodiment, and may preferably have a sheet resistivity of $10^2 \Omega/\square$ or below. Further, the stripe conductor films 161, 201 and 202 provided with a potential gradient may be composed of a transparent conductor film having a sheet resistivity of $10^2 \Omega/\square$ to $1 M\Omega/\square$.

This embodiment first of all has an effect of providing a panel having a display resolution twice as large as the number of pixels formed by patterning. More specifically, by providing transmission electrodes on both sides of a pixel formed by patterning and by suppressing a maximum voltage supplied to the transmission electrodes, the resolution of a display pixel can be increased to twice as large as that of a patterned pixel. In other words, the number of patterned may be sufficient if it is a half of the number of display pixels required. This is advantageous in respect of production because of easiness of pattern etching especially when a high resolution panel of a 10 lines/mm or more of display pixels is produced.

Another advantage of this embodiment is that the effective aperture ratio can be much increased.

Further, a gradational display may be effected by providing a potential gradient along at least one side of conductor film constituting a pixel and by applying gradation signals modulated with respect to the voltage value, pulse duration, the number of pulses, etc., as input signals.

Figure 21:
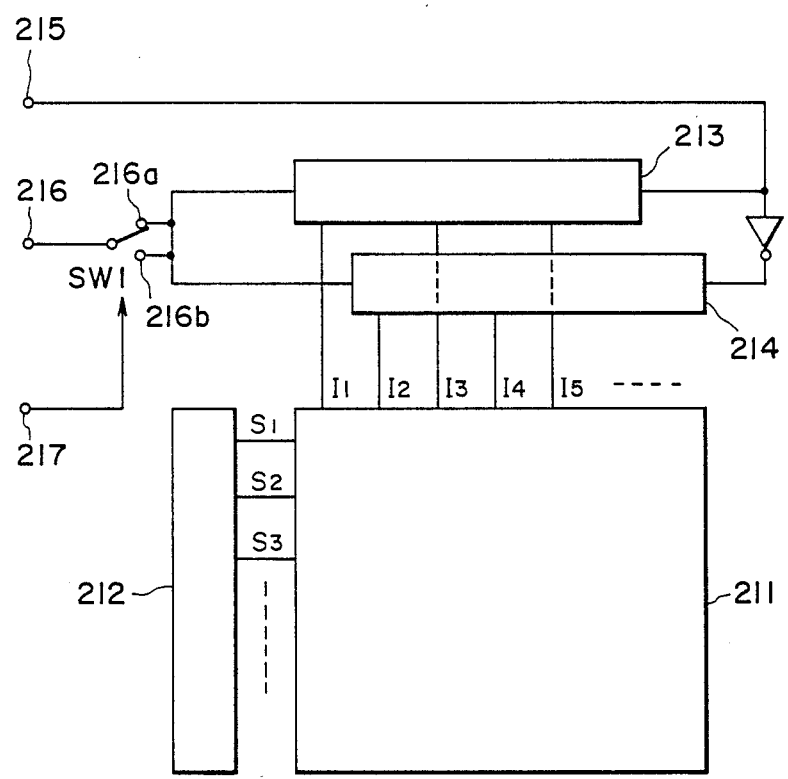
FIG. 21 is a driver circuit diagram showing a driving apparatus according to the invention.

FIG. 21 shows a display panel having at least two memory circuits.

The display panel shown in FIG. 21 comprises an FLC (ferroelectric liquid crystal) panel 211; a scanning line driver circuit 212 for supplying scanning signals to the FLC panel 91 through scanning lines $S_1$, $S_2$, $S_3$, ... ; an odd-numbered data driver circuit 213 having memories for data corresponding to the number of odd-numbered data lines $I_1$, $I_3$, $I_5$, ... to be supplied to pixels on one scanning line; and an even-numbered data driver circuit 214 having memories for data corresponding to the number of even-numbered data lines $I_2$, $I_4$, $I_6$, ... to be supplied to pixels on one scanning line. An output level-controlling input terminal 215 is provided for controlling the output level from the data driver circuits 213 and 214 and supplies a signal of level "1" at which all the outputs from the odd-numbere data driver circuit 213 or the even-numbered driver circuit 214 are helt at a reference voltage and a signal of level "0" at which outputs corresponding to given data are issued. A data input terminal 216 is provided for supplying data signals through a switch SW1. The switch SW1 is connected to a terminal 216a when the control level of a control input from a terminal 217 is "1" and connected to a terminal 216b when the control level is "0".

Figure 24:
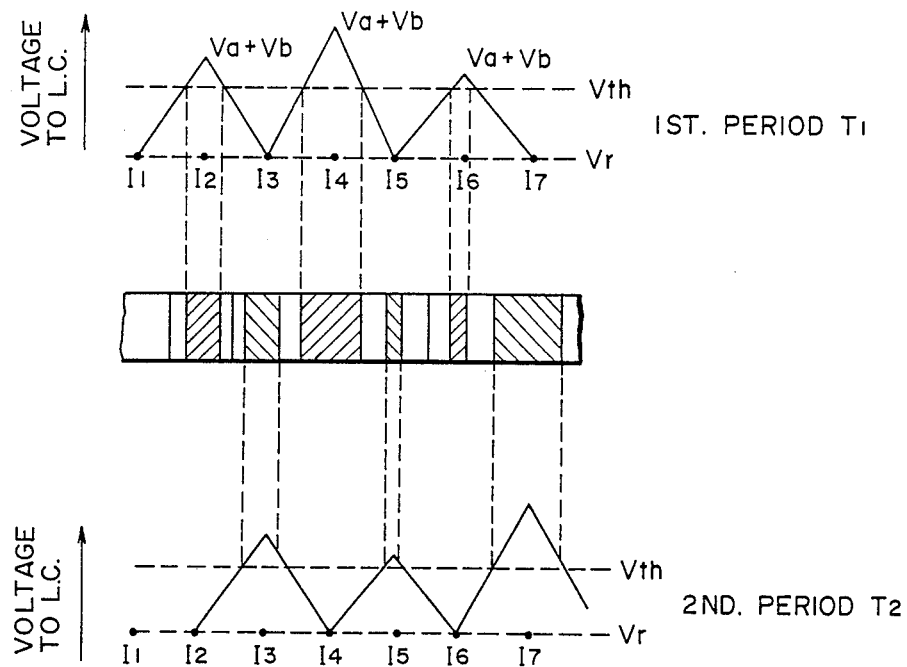
FIG. 24 is an explanatory view showing a potential gradient appearing at pixels on one scanning line and the resultant display states.

Now, in case of a color display, color data as shown in FIG. 22B are supplied to the data input terminal 216. A signal as shown in FIG. 22C is supplied to the switch control terminal for one data time t, whereby memory states as shown in FIG. 22A are formed in memories 213M in the odd-numbered data driver circuit 213 and memories 214M in the even-numbered data driver circuit 214. Further, the FLC panel 212 is provided with color pixels 2100 comprising color filters R (red), G (green), B ... arranged repeatedly in that order as shown in FIG. 22A corresponding to the respective data lines. Now, after color data for one scanning line, such as $R_1$, $G_1$, $B_1$, $R_2$, $G_2$, ... are stored in the memories 213M and 214R allotted depending on whether the data are odd-numbered or even-numbered, a voltage of $-Vb$ is applied to a scanning line $S_1$, whereby the liquid crystal is inverted only at portions where the applied voltage exceeds the threshold voltage Vth. FIG. 23 shows a time chart therefor. In the first period $T_1$, the level of the output level-controlling input terminal 215 is made "1", whereby all the odd-numbered output levels are made a reference voltage Vr and the even-numbered outputs are rendered output voltages Va corresponding to respective given data. This state is shown at 1st period $T_1$ in FIG. 24. In the second period $T_2$, the level of the output level-controlling input terminal is made "0", whereby all the even-numbered outputs are made a reference voltate Vv and the odd-numbered outputs are rendered output voltages Va corresponding to respective given data. This state is show at 2nd period $T_2$ in FIG. 24.

Figure 25:
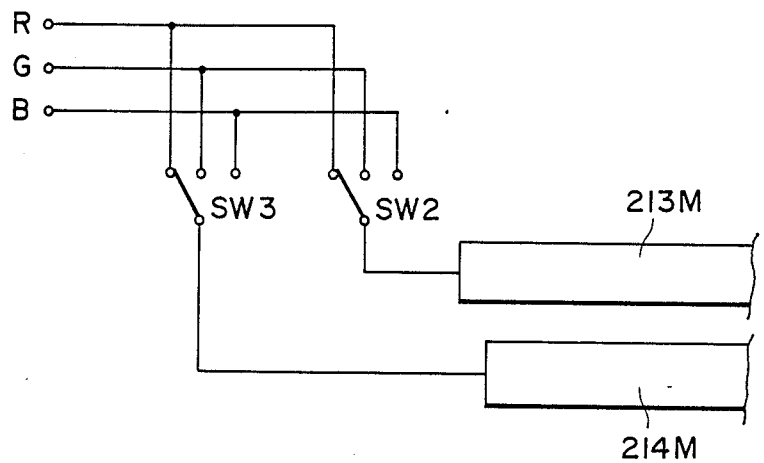
FIG. 25 is another drive circuit diagram for supplying data signals.

FIG. 25 shows a case where R, G and B data are individually supplied. In this case, switches SW2 and SW3 are respectively changed over as shown in FIG. 26 for each data period for R, G or B, whereby respective data are stored in the memories 213M and 214M.

The above mentioned driving method is also applicable to binary color display, white and black display, white-and-black binary display in addition to gradational color display. The memories 213M and 214M may respectively be a shift register of a flip-flop type in case of a binary display and may be an analog memory ofsample-and-hold type as already explained with reference to FIG. 15.

According to this embodiment, a high-speed writing into a display panel becomes possible, and a gradational display may be effected by using gradation signals modulated with respect to the voltage value, pulse duration or number of pulses as input signals.

FIGS. 27–32 refer to an optical modulation panel, comprising:

an optical modulation device comprising a first substrate having thereon a plurality of stripe conductor films, and a first and a second transmission electrode disposed along the longitudinal direction of each stripe conductor film; a second substrate having thereon a plurality of stripe electrodes disposed opposite to and intersecting with the stripe conductor films; and an optical modulation material disposed between the fisrt and second substrates; and means for sequentially supplying a scanning signal of plural levels of the first transmission electrodes, and applying data signals to the stripe electrodes in phase with the scanning signal while connecting the second transmission electrodes to a reference potential supply.

A device as shown in FIG. 16 is for example used. At points of time $t_1$, $t_2$ and $t_3$ respectively spaced with an interval of, e.g., 1 ms, pulses having peak values of $V_{L1}$, $V_{L2}$ and $V_{L3}$ respectively are supplied to the transmission electrodes 163a. At this time, the transmission electrodes 162 are commonly connected to a fixed resistance RS as shown in FIG. 28. When a voltage $V_L$ is applied to a transmission electrode 163, a voltage $V_S$ applied to a transmission electrode 162 is as follows: $V_S = V_L \cdot R_S/(R_L + R_S)$, wherein $R_L$ denotes a resistance between the transmission electrodes 162 and 163. Then, a pixel A formed at an intersection of a conductor film 161b and a counter electrode 164b is written as follows. First, a voltage $V_{L1}$ satisfying a relation of $V_{L1} = $ Vth (Vth: threshold of the liquid crystal) is applied to an electrode 163a and the resistance $R_S$ is set to satisfy $V_{S1} = $ Vth/2, so that $R_S = R_L$ results from the above equation. Under these states, a voltage of $V_L = $ Vth is applied to a transmission electrode 163b and simultaneously a voltage of $V_A = -$ Vth/2 is applied to a counter electrode 164b. As a result, the liquid crystal in the whole region of a pixel A in FIG. 16 is supplied with a voltage exceeding the threshold Vth, whereby the whole region of the pixel A is written in "polier" or "black" depending on the arrangement of polarizers.

Figure 29:
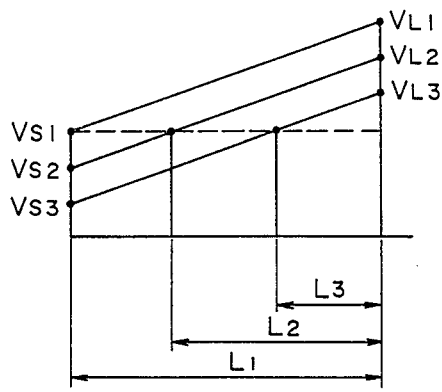
FIGS. 29 and 30A through 30C show voltage waveforms used in the invettion.

Now, when the voltage $V_L$ supplied to the transmission electrode 163b is set to satisfy Vth/2 < $V_L$ < Vth, and the voltage $V_A = -$Vth/2 is simultaneously supplied, the length L (measured from the transmission electrode 163b) providing a region where the voltage Va applied to the liquid crystal exceeds the threshold Vth is calculated by the following formula:

$$V_L/2L_1 = (V_L - Vth/2)/L,$$

wherein $L_1$ denotes the distance between the electrodes 162b and 163b. Thus, when Vth/2 < $V_L$ < Vth, the following equation results: $L = L_1(2 - Vth/V_L)$. Then, a condition for applying a voltage exceeding the threshold Vth is applied to ⅔ of the region of the pixel A is satisfied by applying a voltage $V_{L2}$ (=3Vth/4) as shown in FIG. 29 to the transmission electrode 163b. Further, a condition for applying a voltage exceeding the threshold to ⅓ of the region is satisfied by applying a voltage $V_{L3}$ (=3Vth/5) as shown in FIG. 29 to the transmission electrode 163b.

Figure 30A:
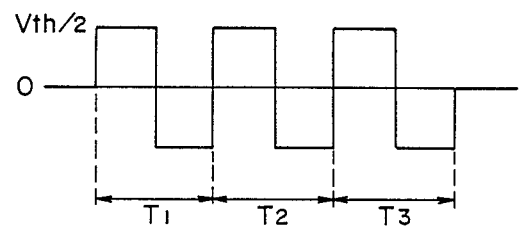
Figure 30B:
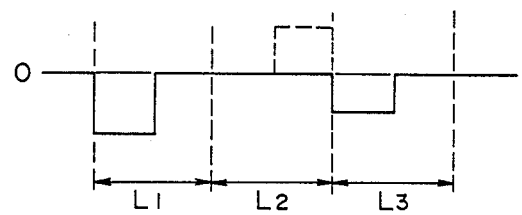

In this way, voltages of $V_{L1}$ = Vth = $V_{L2}$ = 3Vth/4 and $V_{L3}$ = 3Vth/5 are successively applied to the transmission electrode 163b, whereby a voltage exceeding Vth is successively applied to the whole, ⅔ and ⅓ of the region of the pixel A. The signs of the applied voltages are as shown in FIGS. 30A and 30B. For example, when voltage of ±Vth/2 as shown in FIG. 30A are alternately applied to the counter electrode 164b, the transmission electrode 163b is provided with a region of + or − corresponding to the white or black display of the regions $L_1$, $L_2$ and $L_3$ in FIG. 29. At this time, such a synchronous application is effected that the voltage polarity is reverse to that of the voltage applied to the counter electrode 164b. As a result of the above procedure, the regions $L_1$, $L_2$ and $L_3$ are written in white, black and white, respectively, so that the regions of R, G and B are written in white, black and white, respectively.

As described above, according to this embodiment, a region between electrodes can be divided into plural regions of display by applying voltages of plural levels to an electrode.

The above embodiment has been explained with respect to 3 divisions, but it will be readily understood that division into N sub-regions is generally possible, and by providing a condition of N=m×n, it is possible to provide m steps of area gradational display to n regions.

In other words, if there are m stripe electrodes 161 (161a, 161b, ...) and voltages of m levels are applied to electrodes 163 (163a, 163b, ...), it is possible to effect a display of m×n pixels or to effect $m_2$ steps of gradational display at $m_1 \times n$ pixels by providing a condition of $m = m_1 \times m_2$.

This provides a great advantage in production of an actual device that the number of connections between the electrodes in a panel and a driving device therefor in case of a high density display, such as 4 lines/mm or above, or 16 lines/mm or above, in other words, even if the number of electrodes in a panel and the number of driving elements are decreased, a high density and high quality display can be effected. This also provides a great advantage of remarkably decreasing the production cost of a display panel.

For example, in a case where an A4-size display panel having a shoter side of 200 mm is subjected to electrode patterning at a density of 1 pixel or line/mm and is connected 200 driving elements at a rate of 1 line/mm, the panel can be used at a density of 4 pixels/mm as binary display pixels when driven at 4 voltage levels according to the present invention. In the conventional display panel driving system, however, the same density of display requires electrode patterning at a density of 4 lines/mm and connection of 200×2=800 driving elements at a density of 4 lines/mm. Thus, the reduction in production cost of a panel according to the present invention is very remarkable.

Figure 30C:
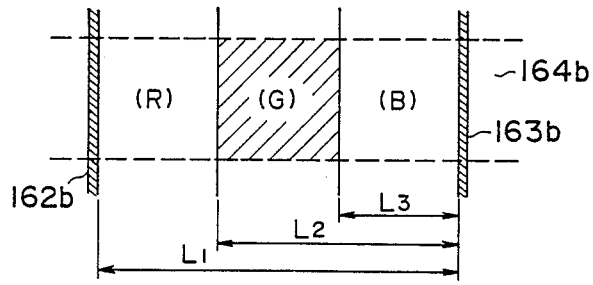

Further, if one patterned electrode is provided with 3 color mosaic filters of red, green and blue as shown in FIG. 30C and 3 levels of voltages are applied according to the present invention, 3 color displays are successively effected by one pattern electrode and one driving element.

Figure 31:
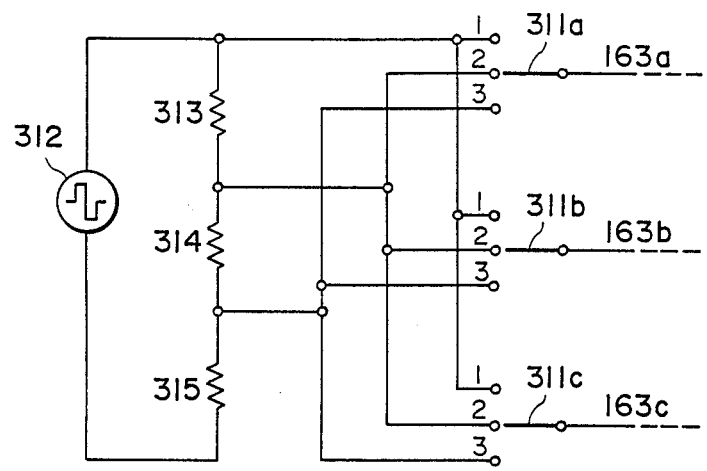
FIGS. 31 and 32 are partial circuit diagrams therefor.

FIG. 31 shows a partial circuit diagram for one embodiment of the present invention, wherein electrodes 163a, 163b and 163c correspond to the electrodes of the same reference numerals in Figure 16. Referring to FIG. 31, electrode changeover switches 301a, 301b and 301c are used to select either one of contacts 1, 2 and 3, each of which constitutes an output terminal for issuing a division of the output of a pulse drive supply 312 through 3 split resistances. The divided outputs correspond to $V_{L1}$, $V_{L2}$ and $V_{L3}$ in FIG. 29 which are given by sequential selection of the contacts 1, 2 and 3 by the switches 311a, 311b and 311c, respectively. As a result, white or black is sequentially written into three divisional regions respectively obtained by dividing each of the electrodes 161a, 161b and 161c shown in FIG. 16.

In a specific embodiment, the stripe electrodes were composed of an $SnO_2$ film of 100 Å A or less in thickness and a sheet resistivity of $10^6 \Omega/\square$ or below. The electrodes 162b and 163b. each having a length of 200 mm were disposed with a spacing of 200 μ and provided a resistance $R_L$ therebetween of about 1 kΩ. Accordingly, the electrodes 162a, 162b and 163c were commonly connected, and a bias resistance $R_S$ was set to 1 kΩ. The threshold voltage Vth of the liquid crystal was 10V. The stripe electrodes 164a, 164b, ... were sequentially supplied with a pulse voltage of a magnitude of ±Vth/2=+5V and a pulse duration of 1 ms. The voltages applied to the transmission electrodes 163a, 163b and 163c were pulse voltage $V_{L1}$, $V_{L2}$ and $V_{L3}$ shown in FIG. 29 respectively having the following magnitudes:

$V_{L1}$=Vth=10V $V_{L2}$=3Vth/4=7.5V $V_{L3}$=3Vth/4=6V.

The signas of the pulses were selected as shown in FIG. 30 to render pixel white or black. The split resistances 313, 314 and 315 were selected as follows so as to provide the above mentioned pulse voltages:

R(313)=25Ω, R(314) 32 15Ω, and R(315)=60Ω.

As described above, in this embodiment, a liquid crystal display panel having a structure as shown in FIG. 16 was prepared in A4 size so as to be adapted to binary monochromatic display at a one side display density of 3×4=12 lines/mm.

Figure 32:
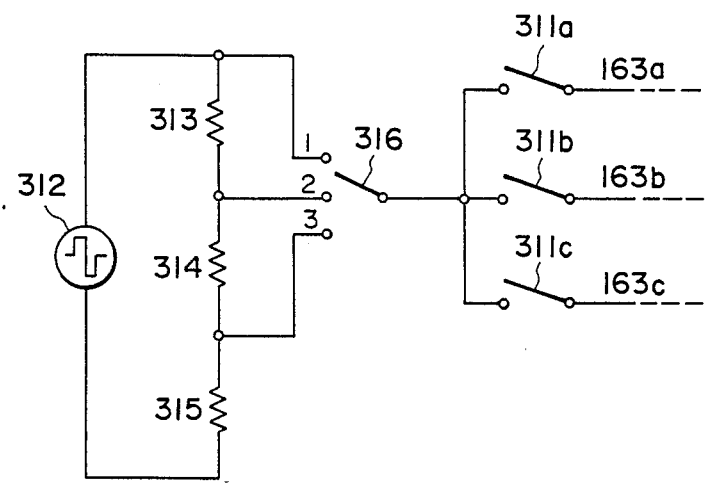

FIG. 32 is a circuit diagram of another embodiment of the driving circuit according to the present invention, wherein the same reference numerals denote similar parts. In this embodiment, however, the following improvements may be accomplished. The switches 301a, 301b and 301c are respectively single contact switches and not multi-contact switches each corresponding to a resolution pixel as used in the embodiment of FIG. 31. Three multi-contact switches in the embodiment of FIG. 31 are integrated into one switch 316 in FIG. 32. As a result, if a comparison is made with respect to number of contacts in a case of m electrodes and a resolution of n for each electrode, the embodiment of FIG. 31 requires m×n contacts, whereas the embodiment of FIG. 32 requires only m+n contact which are drastically fewer than above.

As described above, according to the present invention, there is provided a driving system for an optical modulation device or display panel having high-density pixels over a wide area, by providing a potential gradient along at least one side of conductor film constituting a pixel.

Figure 8B:
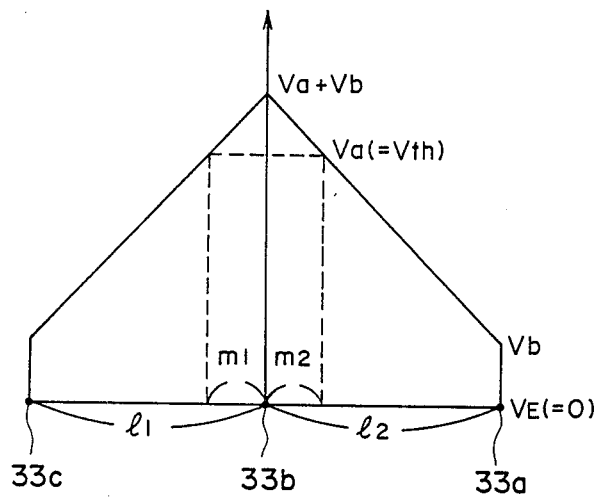

When a potential gradient as shown in Figures 8A and 8B is provided in the present invention, it is actually required that the conditions of Va<Vth and Vb<Vth are satisfied in order to prevent crosstalk. As a result, in FIG. 8B, $m_1 < l_1$, and $m_2 < l_2$, so that Va+Vb<Vth in the neighborhood of the electrodes 33a and 33c where the liquid crystal is not inverted.

In order to obviate the above problem, in the present invention, it is preferred that transmission electrodes selected as every other line, e.g., 33a and 33c are combined into one line 33e, which is counted to a fixed bias voltage supply $V_E$ (not shown) as shown in FIG. 33. In this case, the condition of $V_E$<Vth is required in order to prevent crosstalk.

As a result of the above arrangement, a potential gradients as shown in FIG. 34A are formed between the electrodes 33a and 33b and between the electrodes 33b and 33c. Then, when a voltage of −Vb is applied to a counter electrode 34 in FIG. 3, potential gradients as shown in FIG. 34B appear in regions $L_1$ and $L_2$, wherein Vb<Vth, $V_E$<Vth, and $V_b$ and $V_E$ may be selected to satisfy Va+$V_E$>Vth. As a result, a condition of Va+Vb+$V_E$>Vth can be established over the entire regions of $L_1$ and $L_2$, whereby the entire regions can be utilized as effective pixel areas, thus increasing an effective aperture ratio.

The above embodiment corresponds to a case where the reference point 33e is connected to a point 33e′ shown in FIG. 35A and $V_E$ is a fixed bias as described above. As another embodiment, the reference point 33e may be connected to a point 33e″ shown in FIG. 35B and a fixed resistance $R_E$ is inserted. The fixed resistance $R_E$ must be selected so that Va+$V_E$ <Vth is satisfied with reference to FIG. 34B in order to prevent crosstalk. Further, as the voltage Va is a scanning signal or a gradation signal, Va.max, the maximum of Va, should satisfy: Va.max≦Vth. As a result, $V_E$ should satisfy: 0<$V_E$≦Vth/2.

Now, with reference to FIG. 33, when a resistance between the electrodes 33b and 33e is denoted by Ra, $V_E$ and Va should satisfy a relation of: $V_E$=$R_E$/(Ra+$R_E$)·Va. More specifically, when Va is a gradation signal, the bias $V_E$ is proportional to the gradation signal Va. Further, when the above mentioned desirable restriction on $V_E$ is taken into consideration, $V_E = R_E/(Ra+R_E) \cdot Va \leq Vth/2.$ From this, $R_E$<Ra as Va<Vth. More preferably, if $V_E$ is for example set to satisfy $V_E$=Vth/10, $$\frac{R_E}{Ra + R_E} \cdot Va = \frac{V_{th}}{10}.$$

Further, from the relation of $V_E$+Va<Vth, $R_E$<Ra/8. In other words, the fixed resistance $R_E$ providing the bias voltage $V_E$ is desirably less than ⅛ of the combined resistance of a transmission electrode and both transmission electrodes adjacent thereto.

As described above, in the present invention, an effective aperture ratio can be increased by providing a bias voltage supply $V_E$.

In a particular embodiment, a device shown in FIG. 16 is used. In this embodiment, only one side of transmission electrodes 162 are used as signal electrode to write in the whole region of pixels A, so that the number of signal driver elements can be reduced to one half of that required in an embodiment of using 0 volt as a reference potential wherein the inversion of liquid crystal in an entire pixel cannot be effected by driving only one side of the transmission electrode but can be effected by alternately driving a pair of transmission electrodes disposed on both sides.

As described above according to the present invention, there is provided a driving system for an optical modulation device capable of effecting a gradational display at an improved image quality by forming a potential gradient along at least one side of a conductor film constituting a pixel and by applying gradation signals modulated with respect to the magnitude, pulse duration or number of pulses as input pulses.

FIGS. 36–41 refer to a display panel, comprising: a first substrate, a second substrate, and an optical modulation material disposed between the first and second substrates; at least one of the first and second substrates having thereon a conductor film and a number M of low-resistivity transmission lines, at least one of the first and M-th transmission lines being connected to a reference potential supply.

Figure 36:
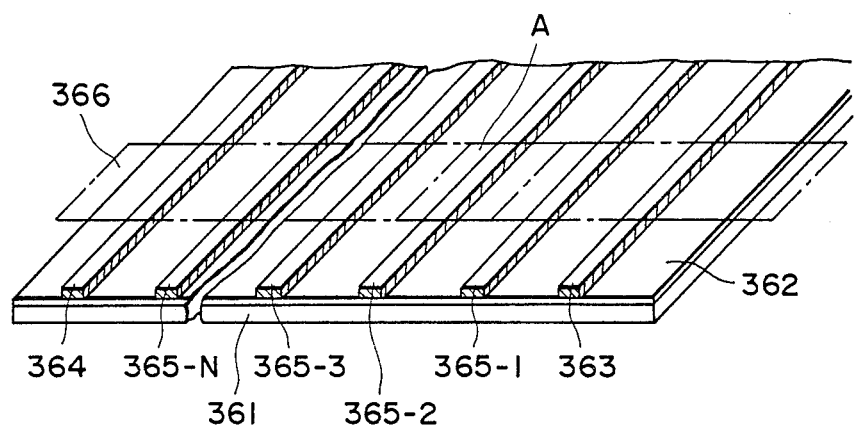
FIG. 36 shows a substrate used in the invention.

Referring to FIG. 36, a substrate 361 on one side has thereon a display conductor film 362, and on the conductor film 362, auxiliary electrodes 363 and 364 of a low-resistivity metal film and transmission electrodes 365-1, 365-2, . . . 365-N of a similar low-resistivity metal film. The auxiliary electrode 363 corresponds to a first transmission electrode the auxiliary electrode 364 corresponds to an M-th transmission electrode. The transmission electrodes 365-1, . . . to 365-N correspond to the second to M-1-th transmission electrodes. The auxiliary electrodes 363 and 364 and the transmission electrode 365 are disposed in parallel with each other and with equal spacings on the display conductor film 362. Opposite the substrate 361, a counter substrate (not shown) having thereon counter conductor films (counter electrodes) is disposed. The conductor films 362 has a region defining a pixel A along a transmission electrode 365 and facing a conductor film 366. Between the display conductor film 362 and the counter conductor film 366 is disposed an optical modulation material as described above.

In the liquid crystal optical device having the above described structure, a scanning signal is applied to a transmission electrode 365-1 to provide a potential gradient along the display conductor film 362, whereby a sub-gradient in potential difference is produced in the electric field between the conductor film 362 and the counter electrode 366. At this time, when a voltage Va is applied to the transmission electrode 365-1 and the transmission electrode 365-2 and the auxiliary electrode 363 adjacent thereto are connected to a reference potential supply $V_E$ (e.g., at 0 volt), a potential difference of Va is developed in a length $l_1$ and $l_2$ along the conductor film 362 between the transmission electrodes 365-1 and 363 and between the transmission electrodes 365-1 and 365-2. This is similar to the one shown in FIG. 8A.

In a specific example, a ferroelectric liquid crystal device as shown in FIG. 36 was prepared in the following manner.

Referring to FIG. 36, an about 200 Å A-thick transparent $SnO_2$ conductor film was formed as a display conductor film 362 on a glass substrate 361. The sheet resistivity of the $SnO_2$ film was $10^5$ Ω/58 . Then, Al was vapor-deposited under vacuum in a thickness of 1000 Å on the $SnO_2$ film and patterned to form the transmission electrodes 365-1 365-2, . . . 365-N and the auxiliary electrodes 363 and 364, respectively, in a width of about 20μ and with a spacing therebetween of 230μ. The M-2 (=N) transmission electrodes and two auxiliary electrodes showed a sheet resistivity of about 0.4 Ω/□. On the other hand, on the counter substrate, a transparent ITO film was formed as a counter electrode 366. The ITO film showed a sheet resistivity of about 20 Ω/□.

Figure 37:
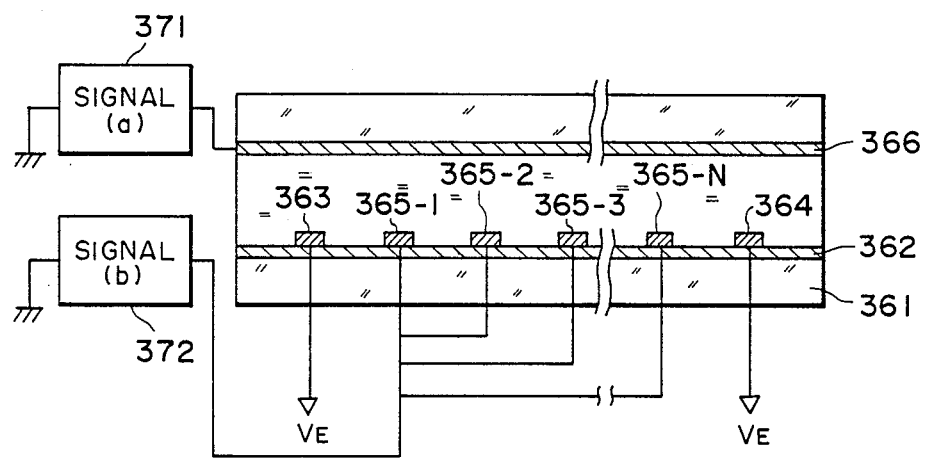
FIG. 37 is a schematic sectional view of a liquid crystal optical device used in the invention.

FIG. 37 schematically illustrates a method of applying electric to a liquid crystal cell as described above with reference to FIG. 36. Now, if a display panel not provided with auxiliary electrodes 363 and 364 and having only transmission electrodes 365-1, 365-2, . . . 365-N, is used, and the transmission electrode 365-1 is use as the first line to form a corresponding pixel, the 365-2 may be connected to a reference potential supply $V_E$ (e.g., at 0 V). At this time, if a signal voltage Va is supplied to the transmission electrode 365-1 as a scanning line, a potential gradient is provided only in length $l_1$ along the conductor film 362 as shown in FIG. 38. As a result, with respect to a pixel B between the transmission electrodes 365-1 and 365-2 shown in, a pulse of, e.g., −20 V is applied to the transmission electrode 365-1 from the driver circuit 372 shown in FIG. 37 (corresponding to FIG. 6E), a region in the pixel B where the liquid crystal is supplied with a voltage exceeding the threshold voltage to cause an inversion thereof is reduced to one half of the entire region of the pixel B. In this way, in a case where only a plurality of transmission electrodes are used, the effective inversion regions corresponding to the first and the last transmission electrode are reduced to one half. This leads a decrease in inversion region in the form of lines at both side ends of a liquid crystal panel.

Accordingly, in the present invention, the auxiliary electrodes 363 and 364 are disposed outside the transmission electrodes 365-1, 365-2, ... 365-N on both sides, and by connecting the auxiliary electrodes 363 and 364 to a reference potential supply $V_E$ (e.g., at 0 V), whereby the above mentioned decrease in inversion region can be obviated.

FIG. 40 illustrates a specific embodiment of application to a matrix drive. A display panel shown in FIG. 40 comprises a glass substrate 403, on which a conductor film 401 is disposed and further thereon low-resistivity auxiliary electrodes 400 and transmission electrodes 402 (402a, 402b, 402c) are disposed.

Opposite the substrate 403 is disposed a counter substrate (not shown) having thereon counter electrodes 404 (404a, 404b, . . . ) in the form of strip conductor films. Between the substrates, a ferroelectric liquid crystal (not shown) is disposed.

In the driving method according to the present invention, prior to writing, all or a prescribed the conductor film 401 between neighboring transmission electrodes 402. The scanning signal is preferably be a voltage pulse having a magnitude equal to or somewhat lower than the threshold voltage of the ferroelectric liquid crystal.

On the other hand, the plurality of stripe counter electrodes 404 are supplied with voltage signals as shown in FIGS. 6A–6E corresponding to given gradation data respectively in phase with the scanning selection signal, whereby the pixels on a scanning line are written depending on given gradation data. By repeating the above writing operation line-sequentially, one picture with gradation as shown in FIG. 41 can be formed.

Figure 41:
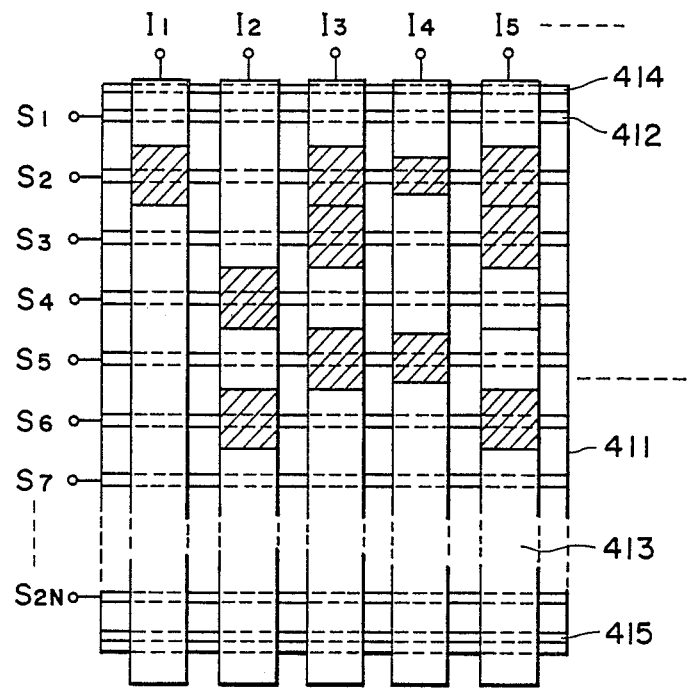
FIG. 41 is a plan view of an electrode arrangement used in the invention together with some display states.

More specifically, the display panel shown in FIG. 41 comprises a display conductor film, part of the pixels formed at intersections of the conductor film 401 and the counter electrodes 404 are brought to either one of the bright state and the dark state simultaneously, e.g., by placing all the transmission electrodes at the same potential to form a uniform electric field betweenthe transmission electrodes and the counter electrodes and by connecting the auxiliary electrode 400 to a reference potential supply (e.g., at 0 V); or prior to writing into pixels on a particular writing line, all or a prescribed part of the pixels on the writing line are brought to either one of the bright and dark states, followed by application of a pulse shown in FIG. 5 as a scanning signal to each of the transmission electrodes (402a, 402b, 402c, . . . ). At this time, transmission electrodes not supplied with a scanning signal are connected to a reference potential supply, whereby a potential gradient is formed along on which are formed auxiliary electrodes 414 and 415 and transmission electrodes 413 ($S_1$, $S_2$, ... $S_{2N}$), respectively in the form of stripes of a low-resistivity metal, with equal spacings. Opposite these stripe electrodes, counter electrodes 413 in the form of stripes are disposed, and a ferroelectric liquid crystal is disposed between the counter electrodes 413 and the display conductor film 411.

The display panel may driven in the following manner. A scanning signal may be first sequentially applied to, e.g., odd-numbered electrodes $S_1$, $S_3$, $S_5$, ... $S_{2N-1}$, and then sequentially applied to the even-numbered $S_2$, $S_4$, $S_6$, ... $S_{2N}$. At this time, the auxiliary electrodes 414 and 415, and the even-numbered electrodes (at the time of scanning the odd-numbered electrodes) or the odd-numbered electrodes (at the time of scanning the even-numbered electrodes) are connected to a reference potential supply (e.g., at 0 V), whereby a potential gradient is formed from a transmission electrode supplied with the scanning signal. Further, as an effect of the present invention, transmission electrodes $S_1$ and $S_N$ disposed at both ends of the display panel can also provide a similar potential gradient. It is also possible to raise the level of the reference potential $V_E$ (i.e., $0 < V_E$). In this case, the value of $V_a - V_E$ becomes smaller so that the resultant potential gradient for providing a gradation becomes moderate, while this may be compensated by decreasing the potential level of data signals supplied. Alternatively, the reference potential $V_E$ may be lowered to enlarge the value of $V_A - V_E$ for enlarging the range of gradation.

According to the present invention, a gradational display may be effected, e.g., in the following manner. A scanning signal is sequentially applied to the stripe transmission electrodes 413 while the auxiliary electrodes 414 and 415 are connected to a reference potential supply $V_E$. Then, in phase with the scanning signal, gradation signals are first supplied to the odd-numbered (or even-numbered) transmission electrodes while the even-numbered (or odd-numbered) transmission electrodes are connected to the reference potential supply $V_E$, and then gradation signals are supplied to the even-numbered (or odd-numbered) transmission electrodes while the odd-numbered (or even-numbered) transmission electrodes are connected to the reference potential supply $V_E$. Thus, gradational driving may be effected over the whole pixels.

Figure 42:
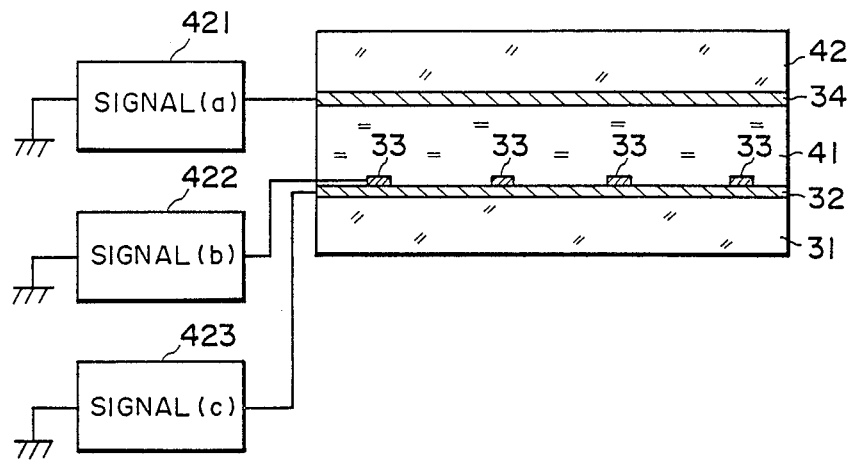
FIG. 42 is a sectional view of a liquid crystal optical device used in the invention.
Figures 43A, 43B:
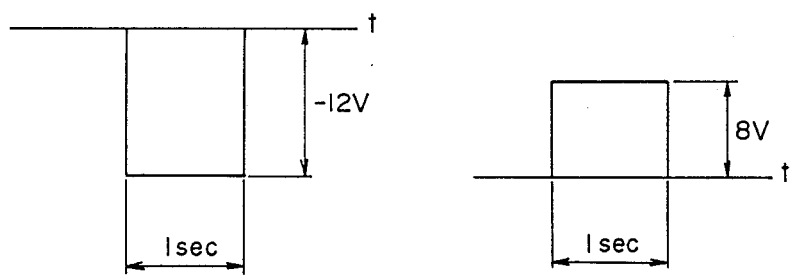
FIGS. 43A and 43B show waveforms of electric signals used in the invention.
Figure 44:
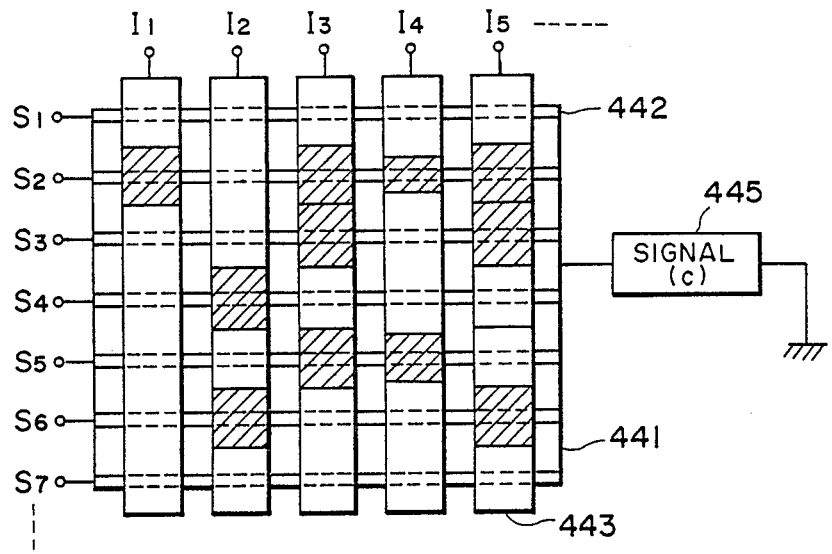
FIG. 44 is a plan view of another liquid crystal optical device used in the invention.

FIGS. 42–44 refer to a display panel, comprising:

an optical modulation device comprising a first substrate, a second substrate, and an optical modulation material disposed between the first and second substrates; at least one of the first and second substrates having thereon a conductor film having a resistivity and a plurality of low-resistivity transmission electrodes electrically connected to the conductor film;

means for applying a voltage exceeding the threshold voltage of the optical modulation material between the conductor film and a counter electrode opposite thereto; and means for supplying a voltage signal to the transmission lines.

FIG. 42 schematically illustrates a method of applying electric signals to an optical modulation device as described above. A driver circuit 421 supplies a signal (a) having a waveform shown in FIG. 43A, and a driver circuit 423 supplies a signal (c) having a waveform shown in FIG. 43B in phase with the signal (a). This step corresponds to a clear or erasure step, whereby all the pixels are supplied with an erasure pulse voltage of 20 V. As a result, the liquid crystal is switched to the first stable state (as the cross nicol polarizers are arranged to provide this state).

FIGS. 43A and 43B show a mere example of erasure pulses and other pulses having different durations and peak values can of course be used instead.

More specifically, when a drive as shown in FIG. 3 is used, the resistance of the conductor film 32 has the same number of resistance as the sheet resistivity, i.e., $10^2 \Omega - 10^5 \Omega$ when the sheet resistivity is $10^2 \Omega/\square - 10^5 \Omega/\square$. On the other hand, the capacitance of a pixel is about 3 pF, so that when the total number of pixels is assumed to be $1000 \times 1000$ by connecting all of 1000 opposite conductor films 34 in parallel, the total capacitance is $3 \times 10^{-2} \times 10^6 = 3 \times 10^{-6} F$. As a result, the time constant thereof is $(10^2 - 10^5) \times 3 \times 10^{-6} = 3 \times 10^{-4} - 3 \times 10^{-1}$ sec. The pulse duration to be used in the clear step in the present invention may be determined while taking the time constant into consideration.

Then, a pulse signal shown in FIG. 5 is supplied from the driver circuit 421 as a scanning signal, and data signals shown in FIGS. 6A–6E are supplied from the driver circuit 422 in phase with the scanning signal.

FIG. 44 shows another embodiment of the present invention. The liquid crystal optical device shown in FIG. 44 comprises a conductor film 441 having thereon a plurality of transmission electrodes 442 disposed parallel to each other and respectively connected to terminals $S_1$, $S_2$, ... which are in turn connected to a scanning signal generator circuit (not shown). The conductor film 441 is connected to a driver circuit 445 for supplying a signal (c). Intersecing with the transmission electrodes 442, a plurality of stripe electrodes 443 are disposed oppositely and a ferroelectric liquid crystal is disposed between the conductor film 441 and the stripe electrodes 443. The terminals $I_1$, $I_2$, ... of the stripe electrodes are respectively connected to a data signal generator circuit. By applying the signals shown in FIGS. 43A and 43B to the electrodes 443 and the conductor film 441, respectively, a plurality of pixels may be simultaneously brought to either a white or black display state.

In this embodiment, a scanning signal is sequentially applied to the terminals $S_1$, $S_2$, ... while the remaining terminals not supplied with the scanning signal are connected to a reference potential supply, whereby a potential gradient can be formed. On the other hand, gradation signals are supplied to the stripe electrodes 443 in phase with the scanning signal, whereby a gradational picture may be formed.

Alternatively, in the present invention, a scanning signal may sequentially applied to the stripe electrodes 443, and in phase with the scanning signal, gradation signals may be applied to the odd-numbered (or even-numbered) transmission electrodes while the even-numbered (or odd-numbered) transmission electrode are connected to a reference potential supply, whereby a gradational driving may also be effected.

It would be apparent that the above explanation also holds true with a case where the upper substrate has the same structure and the same driving circuit as the lower substrate. In this case, the whole area of the liquid crystal cell can be turned on or turned off simultaneously.

According to the present invention, a gradational display and the simultaneous turning-on a turning-off of plural pixels may be effected by forming a potential gradient along at least one conductor film constituting a pixel and by supplying gradation signals modulated with respect to the voltage value, pulse duration or number of pulses is input signals.

In a preferred embodiment according to the present invention, it is preferred that electric signals are supplied in mutually opposite directions to a neighboring couple of transmission electrodes among a plurality of transmission electrodes.

FIG. 46 shows an equivalent circuit of a display panel shown in FIG. 16. A resistance 451 represents that of a stripe conductor film 161, and resistances 452 and 453 represent those of transmission electrodes 162 and 163 disposed along both sides of the conductor film 161 in the longitudinal direction. The respective resistances are not concentrated but distributed uniformly. Now, it is assumed that the stripe conductor film have a sheet resistivity of $10^6$ $\Omega/\square$ and the transmission electrodes 162 and 163 respectively have a sheet resistivity of 0.4 $\Omega/\square$. Further, the transmission electrodes 162 and 163 respectively have a width of 10 $\mu$m and a length of 200 mm and are disposed with a spacing of 250 $\mu$m therebetween. The terminal 456 and 457 are made open.

Figure 46A:
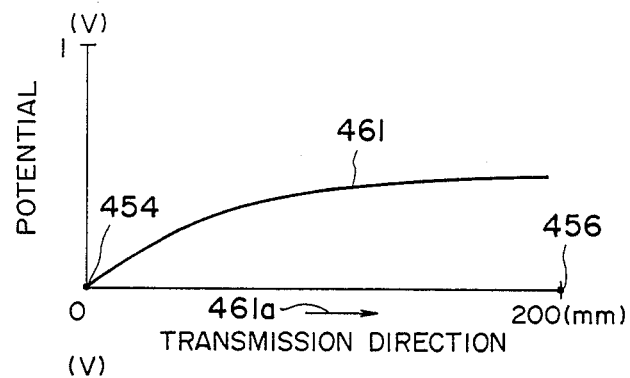
FIGS. 46A-46C potential distributions obtained thereby.
Figure 46B:
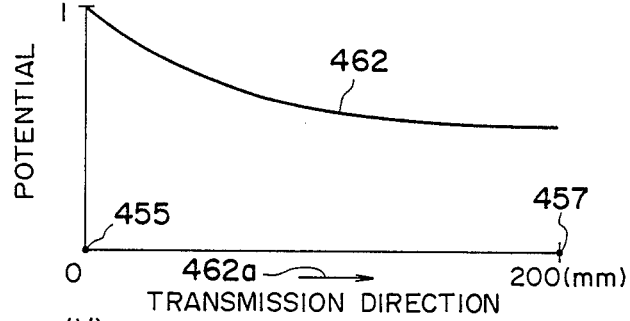
Figure 46C:
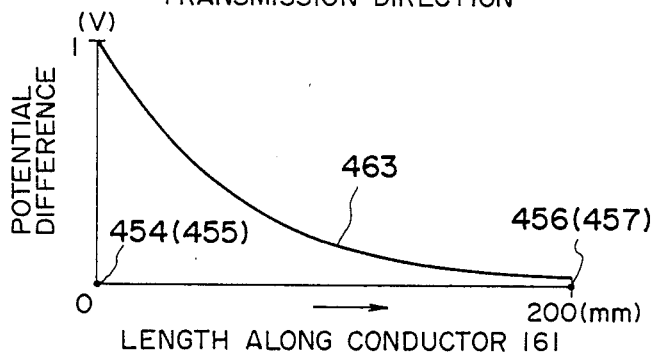

FIG. 46 shows a potential distribution at that time. The curve 461 in FIG. 46A represents a potential distribution along the longitudinal direction of the transmission electrode 162 (between the terminals 454 and 456). The curve 462 in FIG. 46B represents a potential distribution along the longitudinal direction of the transmission electrode 163 (between the terminals 455 and 457). The curve 463 in FIG. 46C represents a change in potential difference between the transmission electrodes 162 and 163 (i.e., along the transverse span of the stripe conductor film 161) along the length of the stripe conductor film 161. As shown in FIG. 46C, the potential difference along the transverse span of the stripe conductor film 161 is TV initially (i.e., between the terminals 454 and 455) but decrease as it leaves away from the terminals 454 and 455 to be almost 0 between the terminals 456 and 457.

Incidentally, in a display panel for forming potential gradients at a high density by arranging transmission electrodes at a high density, the resistance of a stripe conductor film decreases to such an extent that the magnitude thereof should be taken into account compared with that of a transmission electrode, whereby a leakage current through a stripe conductor film increases. As a result, the ground potential increases as it goes away from the contact terminal as shown in FIG. 46A, while the applied voltage decreases as shown in FIG. 46B. Consequently, the potential difference between the transmission electrodes is decreased as it goes away from the contact terminals.

In order to solve the above problem, there may be conceived of (1) lowering the resistance of a transmission electrode or (2) increasing the resistance of a stripe conductor film. However, the resort (1) requires broadening of the transmission electrode width to result in a decrease in aperture ratio, or increase in the transmission electrode thickness to lower the planarity of the substrate and induce alignment defects of the liquid crystal. On the other hand, the resort (2) requires a decrease in thickness of the conductor film which results in ununiformity of resistance and leads to an increase in time of charging the liquid crystal, thereby to increase instability of the system.

Figure 45:
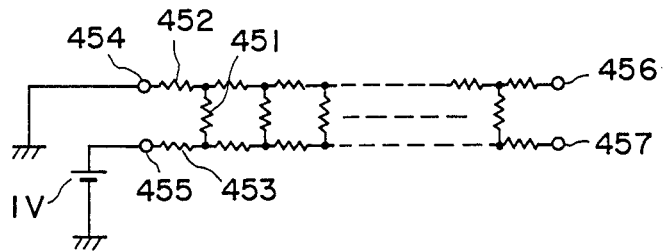
FIG. 45 shows an equivalent circuit of an optical device.
Figure 47:
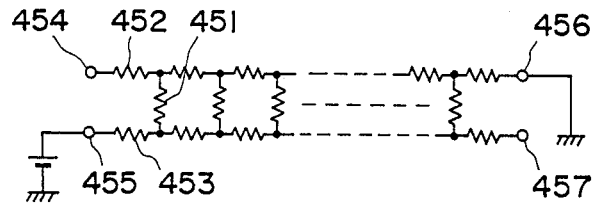
FIG. 47 shows an equivalent circuit of a device used in the invention.

FIG. 47 shows an equivalent circuit of a device used in the present invention. Referring to FIG. 47, of the two terminals 454 and 456 of the transmission electrode 162, the terminal 454 is made open and the terminal 456 is grounded. Further, of the two terminals 455 and 457 of the other transmission electrode 163, the terminal 457 is made open and the terminal 455 is used as the signal application terminal. The other points are the same as explained with reference to FIG. 45.

Figure 48A:
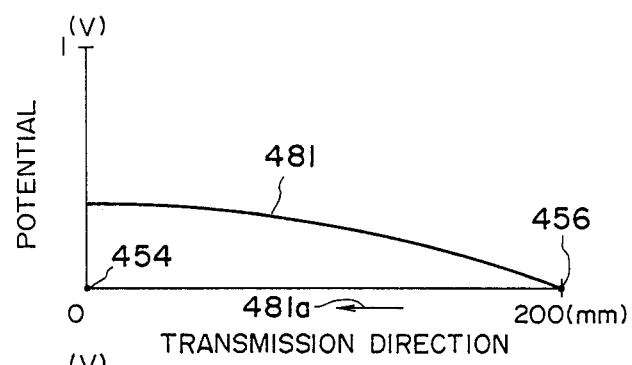
FIGS. 48A-48C show potential distributions obtained thereby.
Figure 48B:
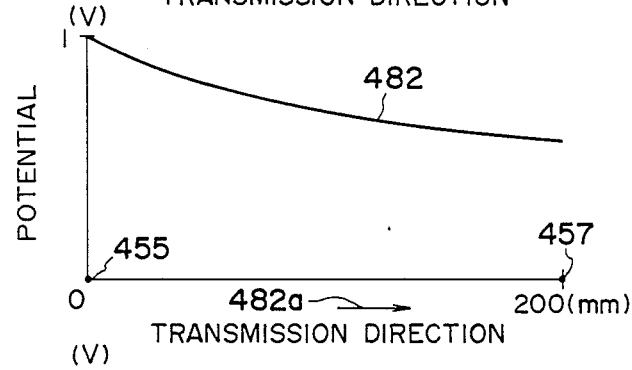
Figure 48C:
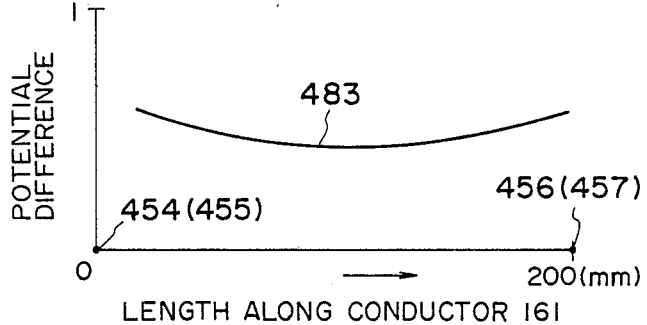

FIG. 48 shows a potential distribution at that time. More specifically, the curve 481 in FIG. 48A represents a potential distribution along the longitudinal direction of the transmission electrode 162 (between the terminals 454 and 456). The curve 482 in FIG. 48B represents a potential distribution along the longitudinal direction of the transmission electrode 163 (between the terminals 455 and 457). The curve 483 in FIG. 48C represents a change in potential difference between the transmission electrodes 162 and 163 (i.e., along the transverse span or width of the stripe conductor film 161).

In this way, by arranging the transmission directions 481a and 482 from the potential supplies mutually in the opposite directions, a conspicuous change in potential difference is suppressed as shown in FIG. 48C. In contrast thereto, in a case where the transmission directions from the potential supplies are the same as shown in FIGS. 46A–46C, a drastic potential difference occurs.

Figure 49:
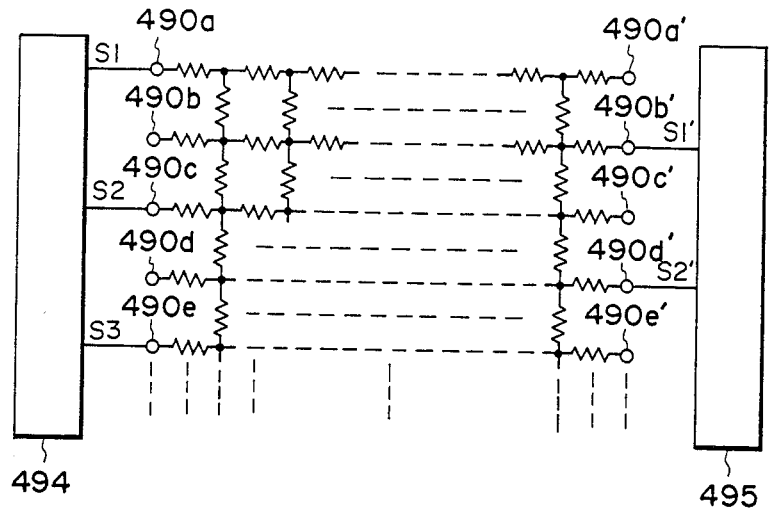
FIG. 49 shows an equivalent circuit of another device used in the invention.

FIG. 49 shows an equivalent circuit of a display panel as shown in FIG. 3 but with transmission directions are arranged according to the present invention. In FIG. 49, reference numeral 492 represents the resistance of a display conductor film 32; and 493a, 493b, 493c, ... represent the resistances of a transmission electrode 33 formed of a low resistivity metal film. The respective resistances are not concentrated but uniformly distributed. Reference numerals 490a, 490b, 490c, ..., 409a', 490b', 490c', ... represent terminals of transmission electrodes, among which the terminals 490a, 490c, 490e, ... are connected to a driver circuit 494 while the terminals 490b, 490d, 490f, ... are made open. On the other hand, the terminals 490b', 490d', ... are connected to a driver circuit 495 while the terminals 490a', 490c', 490e', ... are made open.

Now, outputs $S_1$ and $S_2$ of the driver circuit 494 are placed at a ground potential, and an output $S_1'$ of 1 V is supplied from the driver circuit 495. As a result, between the transmission electrode 33b and each of the transmission electrodes 33a and 33c, a substantially uniform potential difference is developed. Then, outputs $S_1'$ and $S_2'$ of the driver circuit 495 are placed at a ground potential and an output $S_2$ of 1 V is supplied from the driver circuit 494. As a result, between the transmission electrode 33c and each of the transmission electrodes 33b and 33d, a substantially uniform potential difference is developed.

By mutually reversely arranging the transmission directions from potential supplies and by alternately exchanging the transmission directions from two potential supplies, e.g., a reference potential supply and an application signal potential supply, as in the above embodiment, it becomes unnecessary to provide three states of output levels from a driver circuit and the open terminals are always held at a high impedance level.

In the above embodiment, the two potential levels are 1 V of application voltage and a ground potential, but they may be any values.

Further, in the present invention, a gradational picture can be formed by arranging the stripe conductor film in a plurality connected to the transmission electrodes shown in FIG. 47, applying a scanning signal sequentially to the transmission electrodes through terminals as represented by reference number 455 in FIG. 47, and applying data signals modulated with respect to the pulse duration, number of pulses or peak value depending on given gradation data through transmission electrodes disposed perpendicular to the above mentioned transmission electrodes in phase with the scanning signal. In this instance, in the present invention, at least two transmission electrodes, preferably two or three transmission electrodes, are disposed along each stripe conductor film, and the transmission directions of neighboring transmission electrodes from the respective reference supplies are made mutually reverse.

Further, in the display panel shown in FIG. 49, stripe electrodes are disposed perpendicular to the transmission electrodes described as counter electrodes. In a first field, a scanning signal is sequentially applied to the scanning lines $S_1, S_2, S_3, \ldots$ from the driver circuit 494, and in phase with the scanning signal, data signals are applied to the stripe electrodes. In a second field, a scanning signal is sequentially applied to the scanning lines $S_1', S_2', S_3', \ldots$ and in phase with the scanning signal, data signals are applied to the stripe electrodes. In this way, one whole picture may be written in one frame period.

In a preferred embodiment of the present invention, a voltage compensating the above mentioned voltage decrease is superposed on data signals (gradation signals) to prevent the voltage decrease along a transmission electrode.

Figure 50:
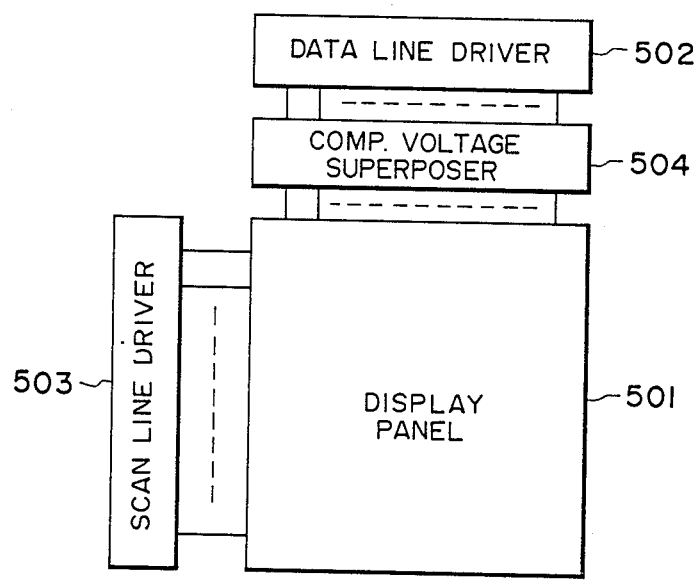
FIG. 50 is a block diagram of an apparatus according to the invention.
Figure 51:
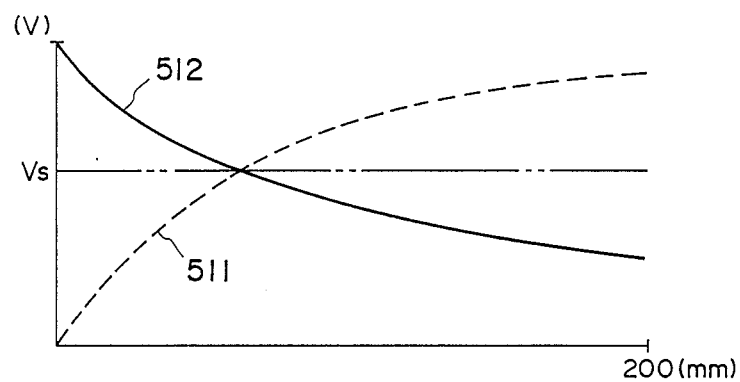
FIG. 51 illustrates a potential distribution and compensation thereof.

FIG. 50 is a block diagram for illustration of the embodiment. The apparatus shown in FIG. 50 comprises a display panel 501, a data line driver circuit 502, a scanning line driver circuit 503, and a compensation voltage superposing circuit 504. The compensation voltage superposing circuit 504 shows a characteristic as shown in FIG. 51. The solid line 512 represents a potential distribution along a transmission electrode, and the dashed line 511 represents a compensation voltage supplied from the compensation voltage superposing circuit 504. By superposing the compensation voltage on the respective data lines, the operation voltage level for driving the liquid crystal can be held at a constant voltage of $V_S$.

Figure 52:
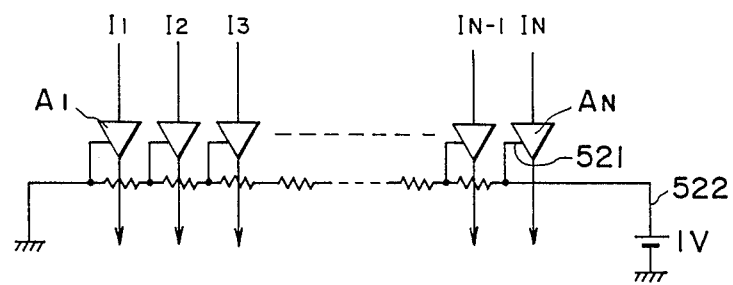
FIG. 52 shows an equivalent circuit of an offset voltage superposing circuit.

FIG. 52 shows a specific embodiment of the compensation voltage superposing circuit 504. The circuit comprises output amplifiers $A_1, A_2, \ldots A_N$ connected to gradation data lines $I_1, I_2, \ldots I_N$, respectively, offset input terminals 521 for the respective output amplifiers, and a dummy line for off set voltage 522. The dummy line for offset voltage 522 is formed of Al, the same material as one constituting a transmission electrode 33 in FIG. 3, and may be formed in the same thickness, width and length as those of the transmission electrode 33.

In this embodiment, a signal potential level of 1 V and a ground potential level are used, but any other potential levels may be used. Incidentally, as shown in FIG. 48C, a potential difference between two transmission electrodes is not a constant value but is a function of a distance along the transmission electrodes. More specifically, if the distance from an applied voltage supply is denoted by x, the voltage difference between transmission electrodes may be represented by Vd(x). This leads to a change in dynamic range of a modulation signal. In a preferred embodiment of the present invention, however, an improved display quality may be attained by changing the amplitudes of gradation signals supplied to a display panel.

Figures 53A, 53B, 53C, 53D:
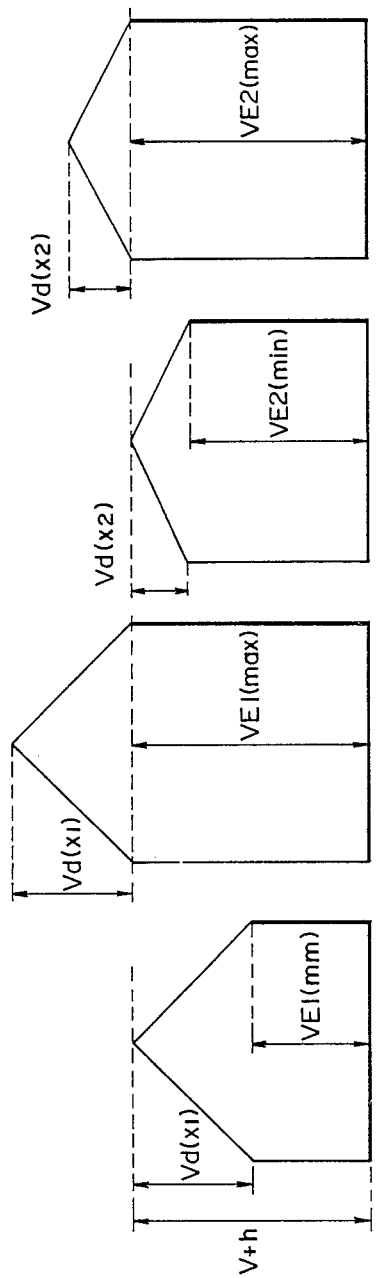
FIGS. 53A through 53D illustrate voltage amplitudes.

FIGS. 53A–53D illustrate such an embodiment. FIGS. 53A and 53B show voltages at a distance $x_1$, where the potential differences are represented by $Vd(x_1)$. In FIG. 53A, the data signal is $V_{E1}$ (min) representing, e.g., a marginal state. In FIG. 53B, the data signal is $V_{E2}$ (max) representing, e.g., a wholly black state. Further, FIGS. 53C and 53D show voltages at a distance x, where the potential differences are represented by $Vd(x_2)$. In FIG. 53C, the data signal is $V_{E2}$ (min) representing, e.g., a wholly white state and in FIG. 53D, the data signal is $V_{E2}$ (max) representing, e.g., a wholly break state. Vth in FIG. 53 represents the threshold voltage of the liquid crystal.

In the above, $Vd(x_1) \neq Vd(x_2)$, $V_{E1}$ (min)$\neq V_{E2}$ (min), and $V_{E1}$ (max)$\neq V_{E2}$ (max).

In this way, at the distance of $x_1$, the maximum amplitude of the data signal is made $Vd(x_1)$, and at the distance of $x_2$, the maximum amplitude of the data signal is made $Vd(x_2)$. Further, at the distance $x_1$, $V_{E1}$ (min) is for a whole white and $V_{E1}$ (max) is for a whole black. At the distance $x_2$, $V_{E2}$ (min) is for a whole white and $V_{E2}$(min) is for a whole black.

Figure 54:
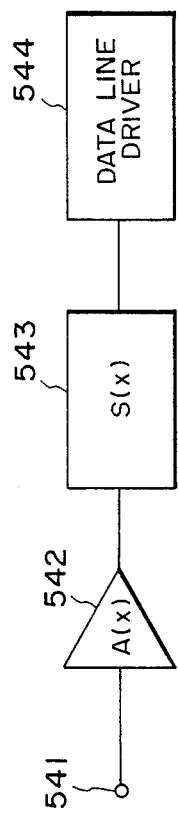
FIG. 54 is a block diagram of an apparatus including an offset-superposing circuit.

FIG. 54 is a block diagram of an electric circuit used in this embodiment. The circuit comprises a data input terminal 541, a variable amplifier 542 with an amplification factor A(x) which is a function of a distance x, an offset superposing circuit 543 with an offset S(x) which is function of a distance x, and a data line driver circuit 544.

In the present invention, in addition to the ferroelectric liquid crystal described above, a twisted nematic liquid crystal, a guest-host liquid crystal, etc. may be used. However, preferably a ferroelectric liquid crystal, particularly a ferroelectric liquid crystal having at least two stable states, may suitably be used.

What is claimed is:

1. An optical modulation apparatus, comprising:
   an optical modulation device comprising a first substrate having thereon a conductor film, and a plurality of first electrodes disposed electrically connected to the conductor film; a second substrate having thereon a plurality of second electrodes; and an optical modulation material disposed between the first and second substrates;
   a scanning line driver circuit comprising means for supplying a scanning line to the second electrodes; and
   a data line driver circuit comprising means for supplying driving signals to odd-numbered electrodes among the first electrodes in phase with the scanning signal and means for supplying data signals to even-numbered electrodes among the first electrodes in phase with the scanning signal.

2. An apparatus according to claim 1, wherein the even-numbered (or odd-numbered) electrodes among the first electrodes are connected to a reference potential supply when data signals are supplied to the odd-numbered (or even-numbered) electrodes among the first electrodes.

3. An apparatus according to claim 1, wherein a scanning selection signal is sequentially supplied to a selected scanning electrode among the second electrodes, and data signals are time-consecutively supplied to the odd-numbered electrodes and the even-numbered electrodes among the first electrodes in phase with the scanning selection signal.

4. An apparatus according to claim 1, wherein a scanning selection signal is sequentially supplied to a selected scanning electrode among the second electrodes, and data signals are supplied to the odd-numbered electrodes and the even-numbered electrodes for each prescribed period.

5. An apparatus according to claim 4, wherein said prescribed period corresponds to a period of one frame or one field of video signals.

6. An apparatus according to claim 1, wherein said data signals are pulse signals having a pulse duration corresponding to given gradation data.

7. An apparatus according to claim 1, wherein said data signals are pulse signals having a number of pulses corresponding to given gradation data.

8. An apparatus according to claim 1, wherein said data signals are pulse signals having a peak value corresponding to given gradation data.

9. An apparatus according to claim 1, wherein said first electrodes have a sheet resistivity smaller than that of the conductor film.

10. An apparatus according to claim 1, wherein said conductor film has a sheet resistivity of $10^2$ $\Omega/\square$ or higher.

11. An apparatus according to claim 1, wherein said optical modulation material is a ferroelectric liquid crystal.

12. An apparatus according to claim 11, wherein said ferroelectric liquid crystal is a chiral smectic liquid crystal.

13. An apparatus according to claim 1, wherein said data line driver circuit comprises two memory circuits.

14. An optical modulation apparatus, comprising:
an optical modulation device comprising a first substrate having thereon a first stripe conductor film and at least two transmission lines disposed electrically connected to the first conductor film; a second substrate having thereon a second stripe conductor film disposed opposite to the first stripe conductor film; and an optical modulation material disposed between the first and second substrates;
means for supplying a data signal to a first transmission line among said at least two transmission lines in phase with a scanning signal supplied to the second conductor film while connecting a second transmission line among said at least two transmission lines to a reference potential supply; and
means for supplying a data signal to a second transmission line among said at least two transmission lines in phase with a scanning signal supplied to the second conductor film while connecting a first transmission line among said at least two transmission lines to a reference potential supply.

15. An apparatus according to claim 14, wherein said data signal is a pulse signal having a pulse duration corresponding to given gradation data.

16. An apparatus according to claim 14, wherein said data signal is a pulse signal having a number of pulses corresponding to given gradation data.

17. An apparatus according to claim 14, wherein said data signal is a pulse signal having a peak value corresponding to given gradation data.

18. An apparatus according to claim 14, wherein the transmission lines have a sheet resistivity smaller than that of the conductor film.

19. An apparatus according to claim 14, wherein said conductor film has a sheet resistivity of $10^2$ $\Omega/\square$ or higher.

20. An apparatus according to claim 14, wherein said optical modulation material is a ferroelectric liquid crystal.

21. An apparatus according to claim 20, wherein said ferroelectric liquid crystal is a chiral smectic liquid crystal.

22. An optical modulation apparatus, comprising:
an optical modulation device comprising a first substrate having thereon a first stripe conductor film and at least two transmission lines disposed electrically connected to the first conductor film; a second substrate having thereon a second stripe conductor film disposed opposite to the first stripe conductor film; and an optical modulation material disposed between the first and second substrates;
means for supplying a scanning signal to a first transmission line among said at least two transmission lines while connecting a second transmission line among said at least two transmission lines to a reference potential supply;
means for supplying a scanning signal to a second transmission line among said at least two transmission lines while connecting a first transmission line among said at least two transmission lines to a reference potential supply; and
means for supplying a data signal to said second stripe conductor film in phase with the scanning signal.

23. An apparatus according to claim 22, wherein said data signal is a pulse signal having a pulse duration corresponding to given gradation data.

24. An apparatus according to claim 22, wherein said data signal is a pulse signal having a number of pulses corresponding to given gradation data.

25. An apparatus according to claim 22, wherein said data signal is a pulse signal having a peak value corresponding to given gradation data.

26. An apparatus according to claim 22, wherein the transmission lines have a sheet resistivity smaller than that of the conductor film.

27. An apparatus according to claim 22, wherein said conductor film has a sheet resistivity of $10^2$ $\Omega/\square$ or higher.

28. An apparatus according to claim 22, wherein said optical modulation material is a ferroelectric liquid crystal.

29. An apparatus according to claim 28, wherein said ferroelectric liquid crystal is a chiral smectic liquid crystal.

30. An optical modulation apparatus, comprising:
an optical modulation device comprising a first substrate having thereon a first stripe conductor film, and at least two transmission lines disposed electrically connected to the first conductor film including a first transmission line and a second transmission line; a second substrate having thereon a second stripe conductor film disposed opposite to the first stripe conductor film, and at least two transmission lines disposed electrically connected to the second conductor film including a third transmission line and a fourth transmission line; and an optical modulation material disposed between the first and second substrates;
means for supplying a scanning signal to the first transmission line while connecting the second transmission line to a reference potential supply, and supplying a data signal to the third transmission line in phase with the scanning signal while connecting the fourth transmission line to a reference potential supply; and means for supplying a scanning signal to the first transmission line while connecting the second transmission line to a reference potential supply, and supplying a data signal to the fourth transmission line in phase with the scanning signal while connecting the third transmission line to a reference potential supply.

31. An apparatus according to claim 30, wherein said data signals are pulse signals having a pulse duration corresponding to given gradation data.

32. An apparatus according to claim 30, wherein said data signals are pulse signals having a number of pulses corresponding to given gradation data.

33. An apparatus according to claim 30, wherein said data signals are pulse signals having a peak value corresponding to given gradation data.

34. An apparatus according to claim 30, wherein said first electrodes have a sheet resistivity smaller than that of the conductor film.

35. An apparatus according to claim 30, wherein said conductor film has a sheet resistivity of $10^2$ $\Omega/\square$ or higher.

36. An apparatus according to claim 30, wherein said optical modulation material is a ferroelectric liquid crystal.

37. An apparatus according to claim 36, wherein said ferroelectric liquid crystal is a chiral smectic liquid crystal.

38. An optical modulation apparatus, comprising:

an optical modulation device comprising a first substrate having thereon a first stripe conductor film, and at least two transmission lines disposed electrically connected to the first conductor film including a first transmission line and a second transmission line; a second substrate having thereon a second stripe conductor film disposed opposite to the first stripe conductor film, and at least two transmission lines disposed electrically connected to the second conductor film including a third transmission line and a fourth transmission line; and an optical modulation material disposed between the first and second substrates;

means for supplying a scanning signal to the first transmission line while connecting the second transmission line to a reference potential supply, and supplying a data signal to the third transmission line in phase with the scanning signal while connecting the fourth transmission line to a reference potential supply;

means for supplying a scanning signal to the first transmission line while connecting the second transmission line to a reference potential supply, and supplying a data signal to the fourth transmission line in phase with the scanning signal while connecting the third transmission line to a reference potential supply;

means for supplying a scanning signal to the second transmission line while connecting the first transmission line to a reference potential supply, and supplying a data signal to the third transmission line in phase with the scanning signal while connecting the fourth transmission line to a reference potential supply; and means for supplying a scanning signal to the second transmission line while connecting the first transmission line to a reference potential supply, and supplying a data signal to the fourth transmission line in phase with the scanning signal while connecting the third transmission line to a reference potential supply.

39. An apparatus according to claim 38, wherein said data signals are pulse signals having a pulse duration corresponding to given gradation data.

40. An apparatus according to claim 38, wherein said data signals are pulse signals having a number of pulses corresponding to given gradation data.

41. An apparatus according to claim 38, wherein said data signals are pulse signals having a peak value corresponding to given gradation data.

42. An apparatus according to claim 38, wherein said first electrodes have a sheet resistivity smaller than that of the conductor film.

43. An apparatus according to claim 38, wherein said conductor film has a sheet resistivity of $10^2$ $\Omega/\square$ higher.

44. An apparatus according to claim 38, wherein said optical modulation material is a ferroelectric liquid crystal.

45. An apparatus according to claim 44, wherein said ferroelectric liquid crystal is a chiral smectic liquid crystal.

46. An apparatus according to claim 14, 22, 30 or 38, wherein the maximum of the scanning signal pulse and the data signal pulse is substantially equal to the threshold voltage of the optical modulation material in the neighborhood of the center of a pixel defined as a superposed region between the conductor film on the first substrate and the conductor film or electrode on the second substrate.

47. An optical modulation apparatus, comprising:

an optical modulation device comprising a first substrate, a second substrate, and an optical modulation material disposed between the first and second substrates, the first substrate having thereon a set of scanning electrodes each comprising a conductor film and at least two low-resistivity transmission lines electrically connected to the conductor film, the second substrate having a set of data electrodes; and driving means comprising a scanning driver circuit for applying a scanning signal serially to each of the scanning electrodes and a data driver circuit for applying data signals in parallel to the data electrodes, wherein the data driver circuit comprises a first memory circuit for memorizing odd-numbered data signals and a second memory circuit for memorizing even-numbered data signals.

48. An apparatus according to claim 47, wherein a data signal supplied from the data driver circuit to the data electrodes is a pulse signal having a peak value corresponding to given gradation data.

49. An apparatus according to claim 47, wherein a data signal supplied from the data driver circuit to the data electrodes is a pulse signal having a pulse duration corresponding to given gradation data.

50. An apparatus according to claim 47, wherein a data signal supplied from the data driver circuit to the data electrode is a pulse signal having a number of pulses corresponding to given gradation data.

51. An apparatus according to claim 47, wherein said transmission lines have a sheet resistivity smaller than that of the conductor film.

52. An apparatus according to claim 47, wherein said conductor film has a sheet resistivity of $10^2$ $\Omega/\square$ or higher.

53. An apparatus according to claim 47, wherein said optical modulation material is a ferroelectric liquid crystal.

54. An apparatus according to claim 53, wherein said ferroelectric liquid crystal is a chiral smectic liquid crystal.

55. An apparatus according to claim 48, wherein the output of said first memory circuit and the output of said second memory circuit comprises a data signal potential.

56. An optical modulation apparatus, comprising:
an optical modulation device comprising a first substrate having thereon a plurality of stripe conductor films, and a first and a second transmission electrode disposed along the longitudinal direction of each stripe conductor film; a second substrate having thereon a plurality of stripe electrodes disposed opposite to and intersecting with the stripe conductor films; and an optical modulation material disposed between the first and second substrates; and
means for sequentially supplying a scanning signal of plural levels to the first transmission electrodes, and applying data signals to the stripe electrodes in phase with the scanning signal while connecting the second transmission electrodes to a reference potential supply.

57. An optical modulation apparatus, comprising:
an optical modulation device comprising a first substrate having thereon a plurality of first stripe conductor films, and a first and a second transmission electrode disposed along the longitudinal direction of each first stripe conductor film; a second substrate having thereon a plurality of second stripe conductor films disposed opposite to and intersecting with the stripe conductor films and a third and a fourth transmission electrode disposed along the longitudinal direction of each second stripe conductor film; and an optical modulation material disposed between the first and second substrates; and
means for sequentially supplying a scanning signal of plural levels to the first transmission electrodes while connecting the second transmission electrodes to a reference potential supply, and applying data signals of plural levels to the third transmission electrodes in phase with the scanning signal while connecting the fourth transmission electrodes to a reference potential supply.

58. An optical modulation apparatus, comprising:
an optical modulation device comprising a first substrate having thereon a plurality of stripe conductor films, and a first and a second transmission electrode disposed along the longitudinal direction of each stripe conductor film; a second substrate having thereon a plurality of stripe electrodes disposed opposite to and intersecting with the stripe conductor films; and an optical modulation material disposed between the first and second substrates;
means for sequentially supplying a scanning signal of plural levels to the first transmission electrodes, and applying data signals to the stripe electrodes in phase with the scanning signal while connecting the second transmission electrodes to a reference potential supply; and
means for setting the reference potential of the reference potential supply to ½ of the threshold potential of the optical modulation material.

59. An optical modulation apparatus, comprising:
an optical modulation device comprising a first substrate having thereon a plurality of first stripe conductor films, and a first and a second transmission electrode disposed along the longitudinal direction of each first stripe conductor film; a second substrate having thereon a plurality of second stripe conductor films disposed opposite to and intersecting with the stripe conductor films and a third and a fourth transmission electrode disposed along the longitudinal direction of each second stripe conductor film; and an optical modulation material disposed between the first and second substrates;
means for sequentially supplying a scanning signal of plural levels to the first transmission lines while connecting the second transmission lines to a reference potential supply;
means for applying data signals of plural levels to the third transmission lines in phase with the scanning signal while connecting the fourth transmission electrodes to a reference potential supply; and
means for setting the reference potential of the reference potential supply to ½ of the threshold potential of the optical modulation material.

60. An optical modulation apparatus, comprising:
an optical modulation device comprising a first substrate having thereon a plurality of stripe conductor films, and a first and a second transmission electrode disposed along the longitudinal direction of each stripe conductor film; a second substrate having thereon a plurality of stripe electrodes disposed opposite to and intersecting with the stripe conductor films; and an optical modulation material disposed between the first and second substrates;
means for sequentially supplying a scanning signal of plural levels to the first transmission lines;
means for applying data signals to the stripe electrodes in phase with the scanning signal; and
means for connecting the second transmission electrodes to a reference potential supply through a resistor having a resistance substantially equal to that between the first transmission electrode and the second transmission electrode.

61. An optical modulation apparatus, comprising:
an optical modulation device comprising a first substrate having thereon a plurality of first stripe conductor films, and a first and a second transmission electrode disposed along the longitudinal direction of each first stripe conductor film; a second substrate-having thereon a plurality of second stripe conductor films disposed opposite to and intersecting with the stripe conductor films and a third and a fourth transmission electrode disposed along the longitudinal direction of each second stripe conductor film; and an optical modulation material disposed between the frst and second substrates;
means for sequentially supplying a scanning signal of plural levels to the first transmission electrodes;
means for connecting the second transmission electrodes to a reference potential supply through a resistor having a resistance substantially equal to that between the first transmission electrode and the second transmission electrode;

means for supplying data signals to the third transmission electrodes in phase with the scanning signal, and means for connecting the third transmission electrodes to a reference potential supply through a resistor having a resistance substantially equal to that between the third transmission electrode and the fourth transmission electrode.

62. An optical modulation apparatus, comprising:
an optical modulation device comprising: a first substrate having thereon a conductor film and at least two transmission electrodes connected to the conductor film, a second substrate having thereon a plurality of stripe electrodes disposed opposite to and intersecting with the transmission electrodes, and an optical modulation material disposed between the first and second substrates;
means for sequentially supplying a scanning signal to the transmission electrodes;
means for connecting a transmission electrode not supplied with the scanning signal to a reference potential supply;
means for supplying data signals to the stripe electrodes in phase with the scanning signal; and means for providing said reference potential supply with a fixed bias voltage or a bias voltage proportional to gradation signals.

63. An optical modulation apparatus, comprising:
an optical modulation device comprising: a first substrate having thereon a conductor film and at least two first transmission electrodes connected to the conductor film, a second substrate having thereon a conductor film disposed opposite to and intersecting with the transmission electrodes and at least two second transmission electrodes connected to the conductor film and disposed to intersect with the first transmission electrode, and an optical modulation material disposed between the first and second substrates;
means for sequentially supplying a scanning signal to the first transmission electrodes;
means for connecting a first transmission electrode not supplied with the scanning signal to a reference potential supply;
means for supplying data signals to the second transmission electrodes in phase with the scanning signal; and
means for providing said reference potential supply with a fixed bias voltage or a bias voltage proportional to gradation signals.

64. An optical modulation device, comprising: a first substrate, a second substrate, and an optical modulation material disposed between the first and second substrates; at least one of the first and second substrates having thereon a conductor film and a number M of low-resistivity transmission lines, at least one of the first and M-th transmission lines having been connected to a reference potential supply.

65. A device according to claim 64, wherein both the first and second substrates have thereon a conductor film and a plurality of low-resistivity transmission lines electrically connected to the conductor film.

66. A device according to claim 64, wherein a scanning signal is supplied to the second to $M-1$-th transmission lines among the transmission lines.

67. A device according to claim 64, wherein data signals are supplied to the second to $M-1$-th transmission lines among the transmission lines.

68. A device according to claim 64, wherein said data signals are pulse signals having a pulse duration corresponding to given gradation data.

69. A device according to claim 64, wherein said data signals are pulse signals having a number of pulses corresponding to given gradation data.

70. A device according to claim 64, wherein said data signals are pulse signals having a peak value corresponding to given gradation data.

71. A device according to claim 64, wherein said conductor film has a sheet resistivity of $10^2$ $\Omega/\square$ or higher.

72. A device according to claim 64, wherein said optical modulation material is a ferroelectric liquid crystal.

73. A device according to claim 72, wherein said ferroelectric liquid crystal is a chiral smectic liquid crystal.

74. An optical modulation apparatus, comprising:
an optical modulation device comprising a first substrate, a second substrate, and an optical modulation material disposed between the first and second substrates; at least one of the first and second substrates having thereon a conductor film having a resistivity and a plurality of low-resistivity transmission lines electrically connected to the conductor film;
means for applying a voltage exceeding the threshold voltage of the optical modulation material between the conductor film and a counter electrode opposite thereto; and
means for supplying a voltage signal to the transmission lines.

75. An apparatus according to claim 74, wherein the voltage signal supplied to the transmission lines is a scanning signal.

76. An apparatus according to claim 74, wherein the voltage signal supplied to the transmission lines is a data signal.

77. An apparatus according to claim 76, wherein said data signal is a pulse signal having a pulse duration corresponding to given gradation data.

78. An apparatus according to claim 76, wherein said data signal is a pulse signal having a number of pulses corresponding to given gradation data.

79. An apparatus according to claim 76, wherein said data signal is a pulse signal having a peak value corresponding to given gradation data.

80. An apparatus according to claim 74, wherein said conductor film has a sheet resistivity of $10^2$ $\Omega/\square$ or higher.

81. An apparatus according to claim 74, wherein said optical modulation material is a ferroelectric liquid crystal.

82. An apparatus according to claim 81, wherein said ferroelectric liquid crystal is a chiral smectic liquid crystal.

83. An optical modulation apparatus, comprising:
a first substrate having thereon a conductor film, and a plurality of transmission lines disposed electrically connected to the conductor film; a second substrate; an optical modulation material disposed between the first and second substrates; and means for supplying a pair of electric signals in mutually opposite transmission directions to neighboring transmission lines among said plurality of transmission lines.

84. An apparatus according to claim 83 wherein one of said pair of electric signals is a scanning signal and the other electric signal is one supplied from a reference potential supply.

85. An apparatus according to claim 83, wherein said conductor film is disposed in the form of a stripe, along the length of which at least two transission lines are disposed electrically connected.

86. An apparatus according to claim 85, wherein neighboring transmission lines among said at least two transmission lines connected to each conductor film are supplied with electric signals in mutually opposite transmission directions.

87. An apparatus according to claim 85 wherein 2 transmission lines are electrically connected to the stripe conductor film.

88. An apparatus according to claim 85, wherein 3 transmission lines are electrically to the stripe conductor film.

89. An apparatus according to claim 83, wherein the second substrate is provided with a stripe electrode.

90. An apparatus according to claim 89, wherein the stripe electrode is supplied with a data signal.

91. An apparatus according to claim 90, wherein said data signal is a pulse signal having a pulse duration corresponding to given gradation data.

92. An apparatus according to claim 90, wherein said data signal is a pulse signal having a number of pulses corresponding to given gradation data.

93. An apparatus according to claim 90, wherein said data signal is a pulse signal having a peak value corresponding to given gradation data.

94. An apparatus according to claim 83, wherein said optical modulation material is a ferroelectric liquid crystal.

95. An apparatus according to claim 94, wherein said ferroelectric liquid crystal is a chiral smectic liquid crystal.

96. An apparatus according to claim 95, wherein said chiral smectic liquid crystal is formed in a layer thin enough to release the helical structure thereof.

97. An apparatus according to claim 83, wherein said conductor film has a sheet resistivity of 10 $K\Omega/\square$-1 $M\Omega/\square$.

98. An apparatus according to claim 83, wherein said transmission line has a sheet resistivity of $10^2$ $\Omega/\square$ or below.

* * * * *

UNITED STATES PATENT AND TRADEMARK OFFICE
CERTIFICATE OF CORRECTION

PATENT NO. : 4,824,218
DATED : April 25, 1989
INVENTOR(S) : MITSUTOSHI KUNO ET AL.       Page 1 of 6

It is certified that error appears in the above-identified patent and that said Letters Patent is hereby corrected as shown below:

SHEET 6 OF 28

FIG. 10B, "SWITICHING" should read --SWITCHING--.
            PULSE                         PULSE

COLUMN 2

Line 55, "invettion;" should read --invention;--.
    Line 57, "through" should read --and--.
    Line 60, "gradient" should read --gradients--.

COLUMN 3

Line 9, "potential" should read --shows potential--.

COLUMN 4

Line 63, "Pat. No. 4367924" should read
        --Pat. No. 4,367,924--.

COLUMN 7

Line 2, "electrddes;" should read --electrodes;--.
    Line 31, "daaa driver circuits 93 and 94" should read
        --data driver circuits 93 and 94--.
    Line 61, "show" should read --shows--.

COLUMN 8

Line 3, "(1st, 3rd, 5th," should read
        --(1st, 3rd, 5th,...)--.
    Line 7, "te" should read --the--.
    Line 34, "of he" should read --of the--.

UNITED STATES PATENT AND TRADEMARK OFFICE
CERTIFICATE OF CORRECTION

PATENT NO. : 4,824,218
DATED : April 25, 1989
INVENTOR(S) : MITSUTOSHI KUNO ET AL.          Page 2 of 6

It is certified that error appears in the above-identified patent and that said Letters Patent is hereby corrected as shown below:

COLUMN 9

Line 26, "even-umbered" should read --even-numbered--.
Line 54, "quest-host" should read --guest-host--.

COLUMN 10

Line 16, "1000" should read --1000Å--.
Line 21, "0.4Ω/☐and" should read --0.4Ω/☐ and--.
Line 24, "formed" should read --formed on--.

COLUMN 11

Line 37, "for" should be deleted.

COLUMN 12

Line 3, "being controlled depending" should be deleted.
Line 4, "on given gradation data. As gradation signals, those" should be deleted.
Line 5, "having a number of pulses corresponding to given gra-" should be deleted.
Line 6, "dation data can be used in" should be deleted.
Line 55, "puse." shuld read --pulse.--.

COLUMN 13

Line 3, "data liens $I_2$, $I_4$, $I_6$,..." should read --data lines $I_2$, $I_4$, $I_6$,...--.
Line 23, "gradation" should read --gradations--.
Line 25, "of another," should read --of another--.
Line 41, "patterned" should read --patterns--.

UNITED STATES PATENT AND TRADEMARK OFFICE
CERTIFICATE OF CORRECTION

PATENT NO. : 4,824,218

DATED : April 25, 1989

INVENTOR(S) : MITSUTOSHI KUNO ET AL.    Page 3 of 6

It is certified that error appears in the above-identified patent and that said Letters Patent is hereby corrected as shown below:

COLUMN 14

Line 3, "odd-numbere" should read --odd-numbered--.
Line 5, "helt" should read --held--.
Line 19, "FLC panel 212" should read --FLC panel 211--.
Line 21, "B..." should read --B(blue)....--.
Line 39, "reference voltate Vv" should read
         --reference voltage Vv--.
Line 54, "ofsample-and-hold" should read
         --of sample-and-hold--.

COLUMN 15

Line 2, "fisrt" should read --first--.
Line 12, "$V_{L3}$respectively" should read
         --$V_{L3}$ respectively--.
Line 60, "voltage" should read --voltages--.

COLUMN 16

Line 31, "shoter" should read --shorter--.
Line 33, "connected" should read --connected to--.
Line 66, "100ÅA" should read --100Å--.
Line 68, "163b." should read --163b--.

UNITED STATES PATENT AND TRADEMARK OFFICE
CERTIFICATE OF CORRECTION

PATENT NO. : 4,824,218
DATED : April 25, 1989
INVENTOR(S) : MITSUTOSHI KUNO ET AL.

It is certified that error appears in the above-identified patent and that said Letters Patent is hereby corrected as shown below:

COLUMN 17

Line 1, "200 µand" should read --200µ and--.
Line 8, "Thc" should read --The--.
Line 9, "applicd" should read --applied--.
Line 10, "voltage" should read --voltages--.
Line 17, "$V_{L3}=3Vth/4=6V.$" should read --$V_{L3}=3Vth/5=6V.$--.
Line 18, "signas" should read --signs--.
Line 23, "$R(313)=25\Omega$, $R(314)$ 32 $15\Omega$, and $R(315)=60\Omega.$" should read --$R(313)=25\Omega$, $R(314)=15\Omega$, and $R(315)=60\Omega.$--.
Line 44, "m+n contact" should read --m+n contacts--.

COLUMN 19

Line 12, "electrode" should read --electrode,--.
Line 21, "films" should read --film--.
Line 45, "200AA-thick" should read --200A-thick--.
Line 48, "$10^5\Omega/58.$" should read --$10^5\Omega/\_.$--.
Line 60, "electric" should read --electricity--.
Line 65, "use" should read --used--.
Line 66, "365-2" should read --365-2,--.

COLUMN 20

Line 4, "shown in," should read --as shown in FIG.38,--.
Line 36, "prescribed" should read --prescribed part of--.
Line 38, "be" should be deleted.
Line 56, "betweenthe" should read --between the--.

UNITED STATES PATENT AND TRADEMARK OFFICE
CERTIFICATE OF CORRECTION

PATENT NO. : 4,824,218
DATED : April 25, 1989
INVENTOR(S) : MITSUTOSHI KUNO ET AL.

It is certified that error appears in the above-identified patent and that said Letters Patent is hereby corrected as shown below:

COLUMN 22

Line 33, "Intersecing" should read --Intersecting--.
    Line 53, "applied" should read --be applied--.
    Line 57, "electrode" should read --electrodes--.
    Line 66, "a" should read --and--.

COLUMN 23

Line 3, "is" should read --are--.
    Line 22, "terminal 456 and 457" should read --terminals 456 and 457--.
    Line 37, "decrease" should read --decreases--.

COLUMN 24

Line 33, "409a'," should read --490a',--.

COLUMN 25

Line 49, "off set voltage 522." should read --offset voltage 522.--.

COLUMN 26

Line 12, "break" should read --black--.

COLUMN 32

Line 55, "strate-having" should read --strate having--.

UNITED STATES PATENT AND TRADEMARK OFFICE
CERTIFICATE OF CORRECTION

PATENT NO. : 4,824,218
DATED : April 25, 1989
INVENTOR(S) : MITSUTOSHI KUNO ET AL.

Page 6 of 6

It is certified that error appears in the above-identified patent and that said Letters Patent is hereby corrected as shown below:

<u>COLUMN 35</u>

Line 1, "claim 83" should read --claim 83,--.
Line 15, "claim 85" should read --claim 85,--.
Line 19, "electrically to" should read
        --electrically connected to--.

Signed and Sealed this

Eleventh Day of September, 1990

Attest:

HARRY F. MANBECK, JR.

*Attesting Officer*  *Commissioner of Patents and Trademarks*